(12) United States Patent
Takeuchi et al.

(10) Patent No.: US 8,143,826 B2
(45) Date of Patent: Mar. 27, 2012

(54) DRIVE CONTROL CIRCUIT FOR ELECTRIC MOTOR

(75) Inventors: Kesatoshi Takeuchi, Shiojiri (JP); Takafumi Suzuki, Nagoya (JP)

(73) Assignee: Seiko Epson Corporation (JP)

( * ) Notice: Subject to any disclaimer, the term of this patent is extended or adjusted under 35 U.S.C. 154(b) by 461 days.

(21) Appl. No.: 12/145,544

(22) Filed: Jun. 25, 2008

(65) Prior Publication Data

US 2009/0001913 A1 Jan. 1, 2009

(30) Foreign Application Priority Data

Jun. 28, 2007 (JP) ................................. 2007-170549
Jan. 9, 2008 (JP) ................................. 2008-002610
May 14, 2008 (JP) ................................. 2008-127581

(51) Int. Cl.
*H02P 6/16* (2006.01)
(52) U.S. Cl. ............... 318/400.04; 318/400.01; 318/700
(58) Field of Classification Search ............ 318/400.01, 318/400.04, 700
See application file for complete search history.

(56) References Cited

U.S. PATENT DOCUMENTS

| | | | | |
|---|---|---|---|---|
| 4,772,830 A * | 9/1988 | Kobari et al. | ................ | 318/563 |
| 5,814,957 A * | 9/1998 | Yoshida | ................ | 318/400.11 |
| 6,400,107 B1 | 6/2002 | Nakatani et al. | | |
| 6,483,266 B2 * | 11/2002 | Miyazaki et al. | ........ | 318/400.34 |
| 6,943,510 B2 * | 9/2005 | Gorti | ................ | 318/275 |
| 2003/0034755 A1 | 2/2003 | Krefta et al. | | |
| 2003/0107338 A1 * | 6/2003 | Kokami et al. | ................ | 318/254 |
| 2005/0189892 A1 * | 9/2005 | Kokami et al. | ................ | 318/254 |
| 2006/0055352 A1 * | 3/2006 | Mori et al. | .................... | 318/432 |
| 2006/0064609 A1 * | 3/2006 | Bryan | ......................... | 714/700 |
| 2006/0097598 A1 | 5/2006 | Lelkes et al. | | |
| 2006/0181232 A1 * | 8/2006 | Oljaca et al. | ................ | 318/268 |
| 2006/0279166 A1 * | 12/2006 | Takeuchi | ................ | 310/268 |
| 2009/0039809 A1 * | 2/2009 | Takeuchi | ................ | 318/400.09 |

FOREIGN PATENT DOCUMENTS

| | | |
|---|---|---|
| EP | 1026820 | 8/2000 |
| EP | 1091480 | 4/2001 |
| JP | 3357625 | 10/2002 |
| JP | 3433109 | 5/2003 |
| JP | 2004080920 A * | 3/2004 |
| JP | 2006-174648 | 6/2006 |
| JP | 2007-060862 | 3/2007 |
| WO | WO 2005/112230 | 11/2005 |
| WO | WO 2006/023427 | 3/2006 |

OTHER PUBLICATIONS

European Search Report, Issued Dec. 22, 2010.

* cited by examiner

*Primary Examiner* — Walter Benson
*Assistant Examiner* — Kawing Chan
(74) *Attorney, Agent, or Firm* — Harness, Dickey & Pierce, P.L.C.

(57) ABSTRACT

A drive control circuit includes: an original drive signal generator generating an original drive signal based on a positional signal indicating a relative position of a first member and a second member of an electric motor; an excitation ratio signal generator generating an excitation ratio signal indicating a ratio of excitation interval to non-excitation interval of coils of the electric motor based on a speed signal indicating a relative speed of the first member and the second member of the electric motor; an excitation interval signal generator generating a binary excitation interval signal specifying the excitation interval and the non-excitation interval of the coils of the electric motor based on the positional signal and the excitation ratio signal; and a mask circuit generating a drive signal for driving the electric motor by masking part of the original drive signal based on the excitation interval signal.

17 Claims, 31 Drawing Sheets

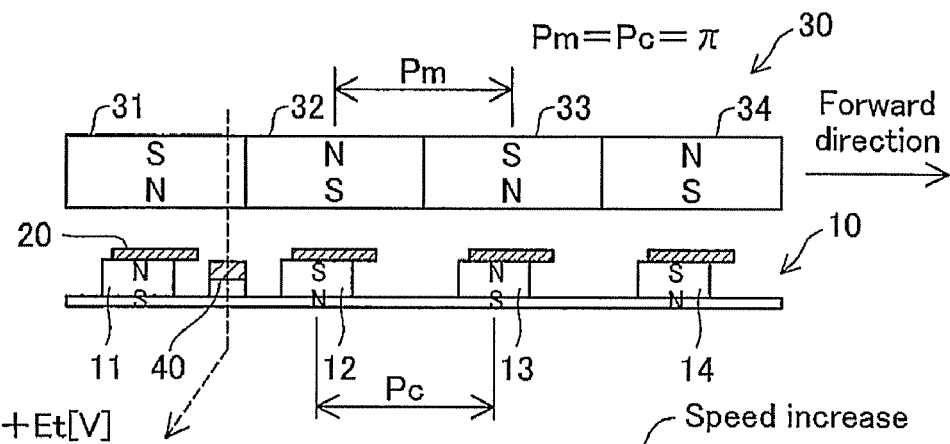
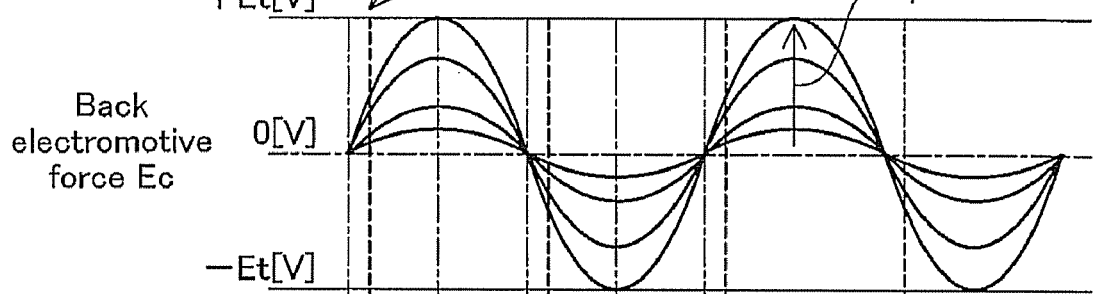
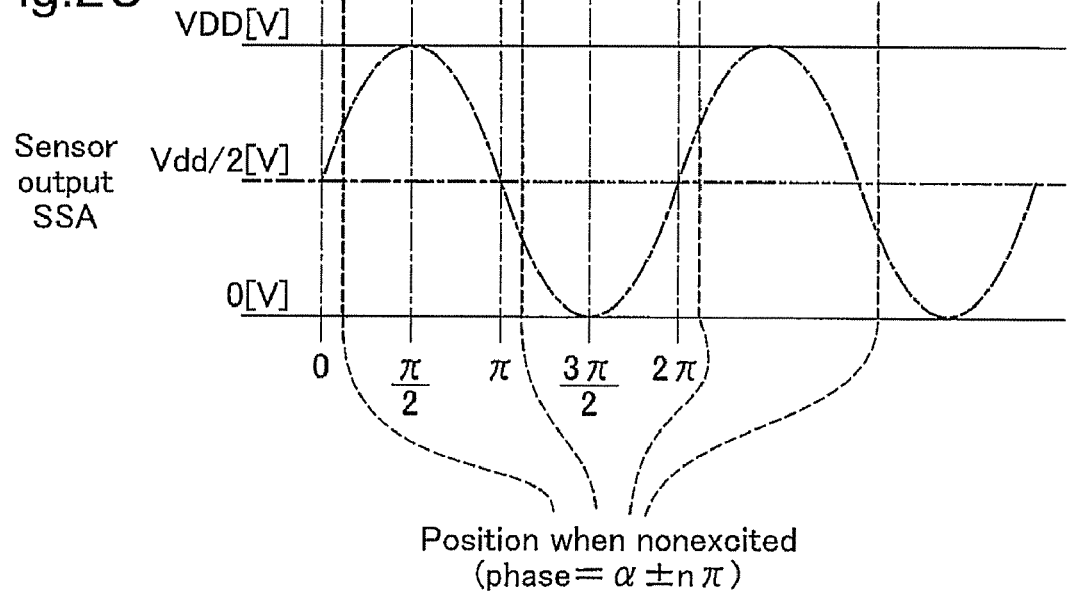

$Y = a \cdot X + b$
or
$Y = a(X + b)$

Fig.9A
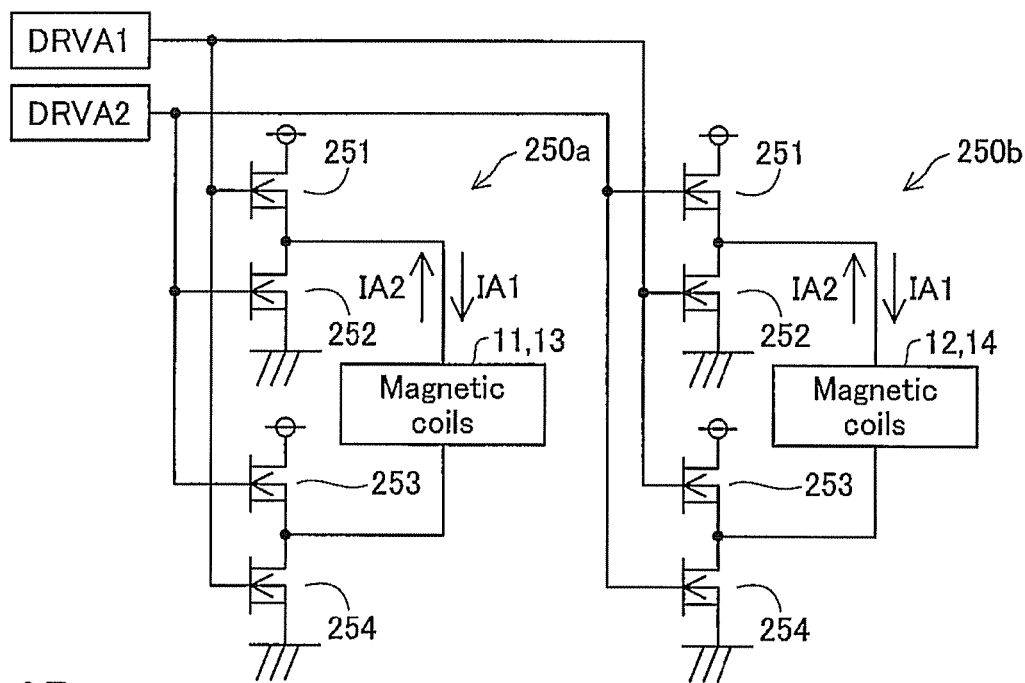
Fig.9B
Operation of first bridge circuit 250a
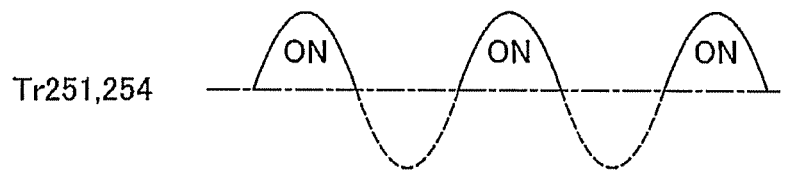
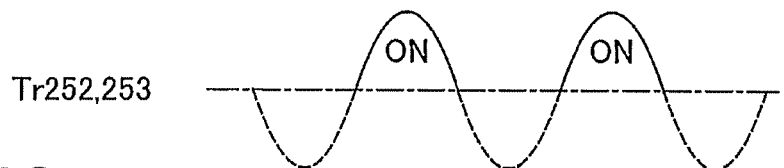
Fig.9C
Operation of second bridge circuit 250b
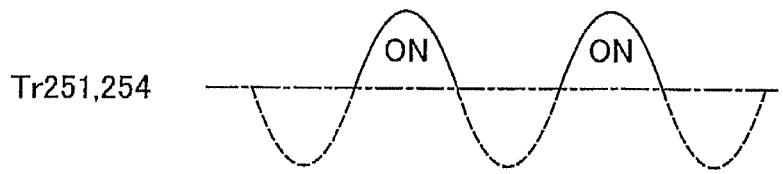
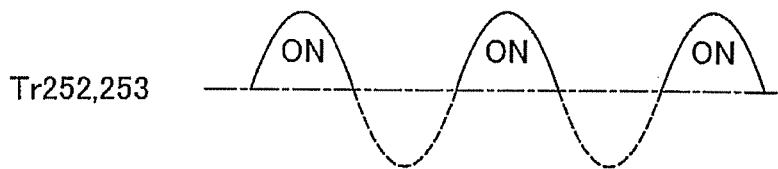

2-pole parallel winding 2-pole series winding 4-pole parallel winding 4-pole series winding

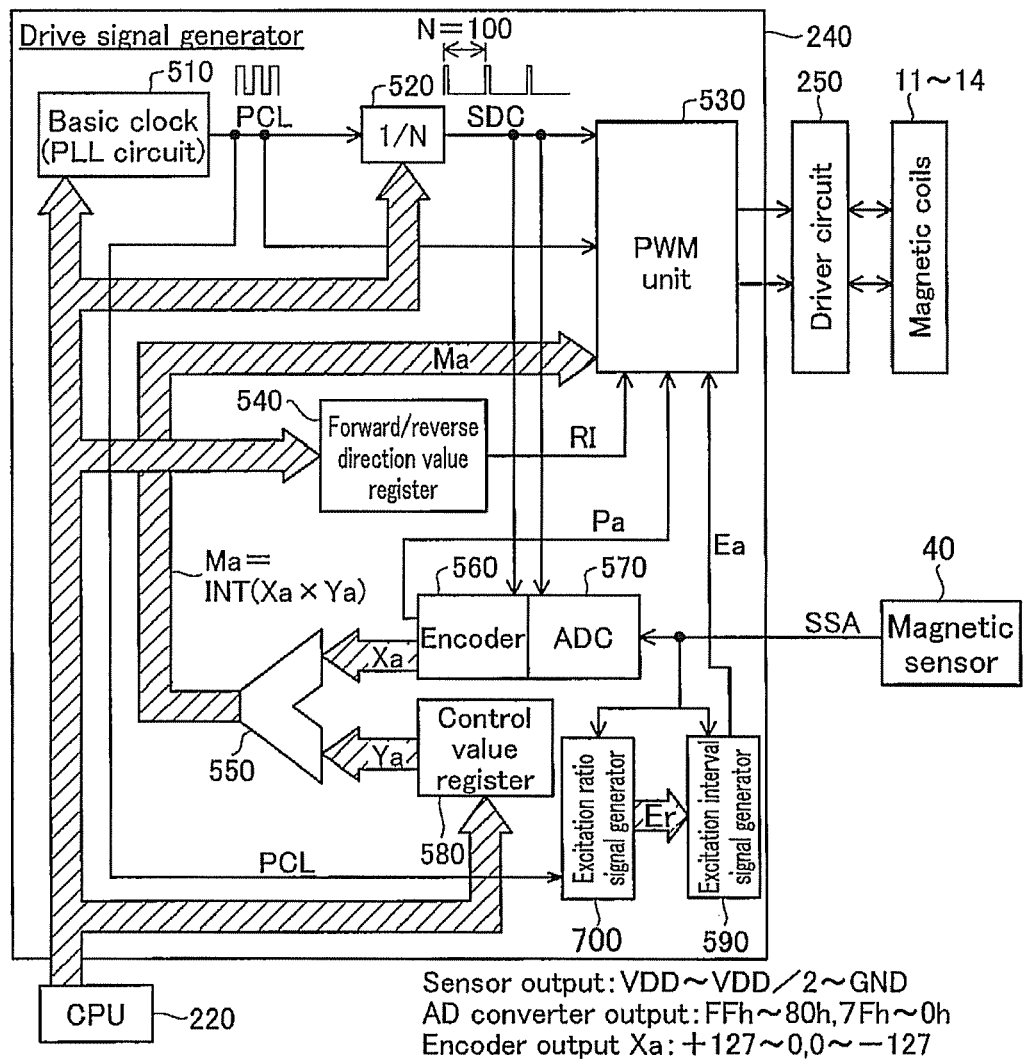

SSA

DRVA1+DRVA2
(All excitation)

DRVA1+DRVA2
(Excitation
interval setting)

Excitation interval EP
Non-excitation interval NEP

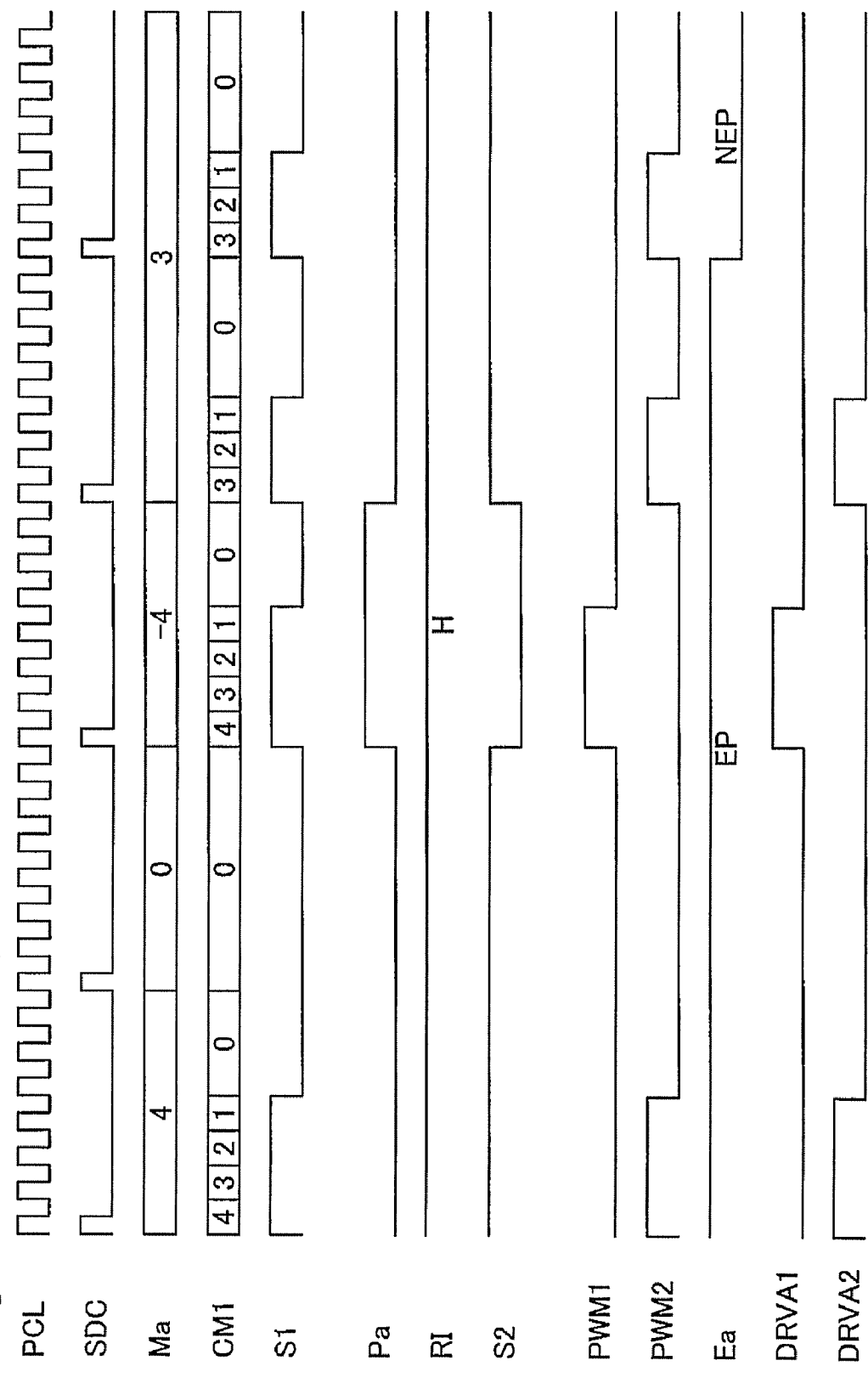

At startup: electronic VR=0Ω

Offset region OF (non-excitation interval)

Current attenuated as moving speed increases

At constant speed: VR≠0Ω

Current waveform at startup

Current attenuated as moving speed increases

DRIVE CONTROL CIRCUIT FOR ELECTRIC MOTOR

CROSS-REFERENCE TO RELATED APPLICATIONS

The present application claims the priority based on Japanese Patent Applications No. 2007-170549 filed on Jun. 28, 2007; No. 2008-2610 filed on Jan. 9, 2008; and No. 2008-127581 filed on May 14, 2008, the disclosures of which are hereby incorporated by reference in their entireties.

BACKGROUND OF THE INVENTION

1. Field of the Invention

The present invention relates to control of excitation interval of the coils of an electric motor.

2. Description of the Related Art

In a electric motor disclosed in WO2005/112230 A1, a drive signal of the electric motor is masked to reduce power consumption.

However, a problem with this approach is that if the excitation interval is limited from the time of initial motion of the motor, the motor cannot be started up in some instances.

SUMMARY

An object of the present invention is to provide technology that is able to vary the excitation interval at will depending on the speed of the drive section of the electric motor.

According to an aspect of the present invention, a drive control circuit for an electric motor is provided. The drive control circuit comprises: an original drive signal generator that generates an original drive signal, based on a positional signal which indicates a relative position of a first drive member and a second drive member of the electric motor; an excitation ratio signal generator that generates an excitation ratio signal which indicates a ratio of excitation interval to non-excitation interval of coils of the electric motor, based on a speed signal indicating a relative speed of the first drive member and the second drive member of the electric motor; an excitation interval signal generator that generates a binary excitation interval signal which specifies the excitation interval and the non-excitation interval of the coils of the electric motor, based on the positional signal and the excitation ratio signal; and a mask circuit that generates a drive signal for driving the electric motor by masking part of the original drive signal based on the excitation interval signal.

According to this configuration, the excitation interval ratio is set on the basis of a speed signal from the drive section of the electric motor, and thus the excitation interval may be varied at will depending on the speed of the drive section of the electric motor.

The present invention may be reduced to practice in various forms, for example, as a method and a device for drive control of an electric motor; a drive control semiconductor device; a drive control system; a computer program for accomplishing the functions of such a method or device; a recording medium having such a computer program recorded thereon; an electric motor furnished with a drive control circuit; a projector, mobile device, robot, and movable body equipped with the electric motor; and so on.

BRIEF DESCRIPTION OF THE DRAWINGS

FIGS. 2A to 2C are illustrations depicting positional relationship of a magnet array and a coil array, and the relationship of magnetic sensor output to back electromotive force waveform.

FIGS. 9A to 9C are illustrations of another configuration and operation of a driver circuit.

FIGS. 11A to 11E are illustrations depicting internal configuration and operation of a drive signal generator.

FIG. 15 is a timing chart depicting operation of the PWM unit during reverse rotation of the motor.

DESCRIPTION OF THE PREFERRED EMBODIMENT

Next, aspects of the present invention will be described in the following order on the basis of embodiments:
A. Embodiment 1
  A1. Overview of Configuration and Operation of Motor:
  A2. Configuration of Drive Control Circuit:
B. Embodiment 2
C. Embodiment 3
D. Modifications
E. Other Embodiments

A. Embodiment 1

A1. Overview of Configuration and Operation of Motor

Figure 1A:
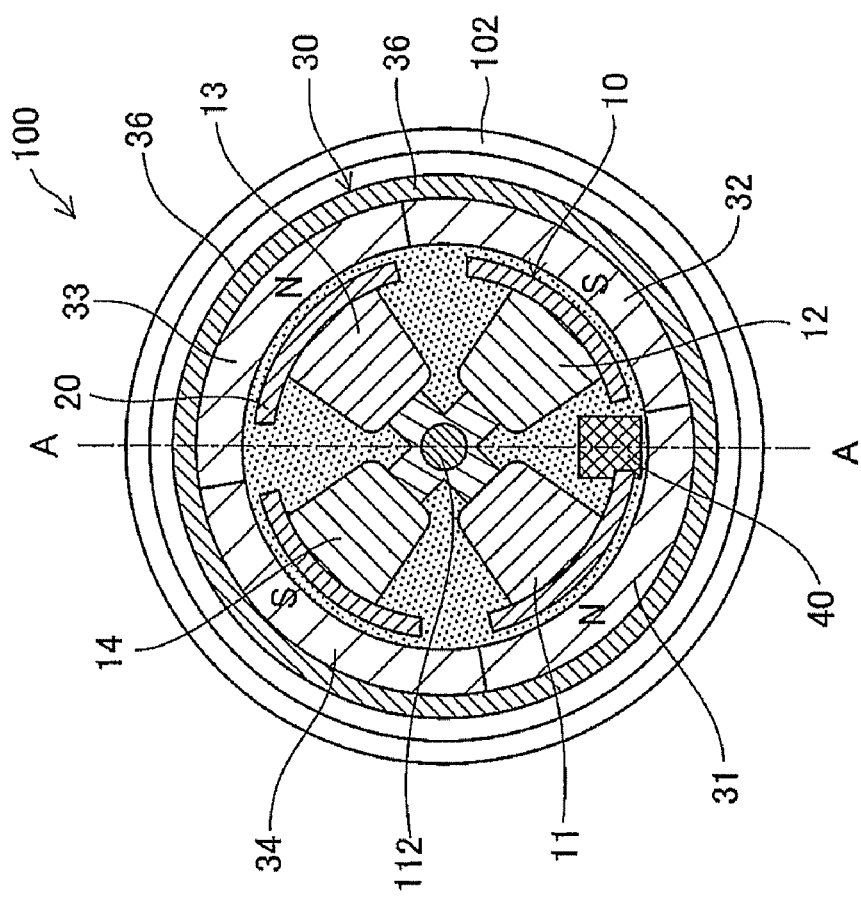
FIGS. 1A and 1B are sectional views depicting configuration of the motor unit of a single phase brushless motor as a first embodiment of the present invention.
Figure 1B:
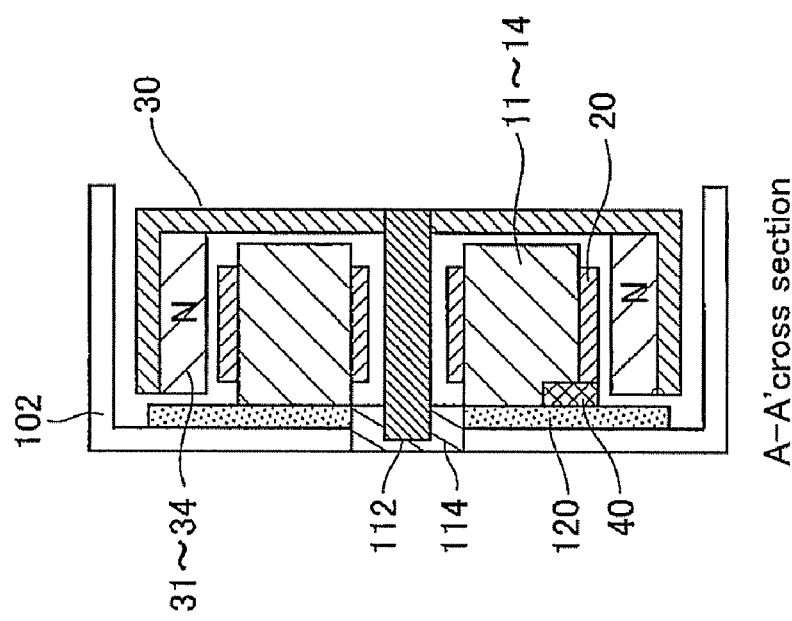

FIGS. 1A and 1B are sectional views depicting the configuration of the motor unit of a single-phase brushless motor in Embodiment 1. This motor unit 100 has a stator portion 10 and a rotor portion 30, each of generally cylindrical tube shape. The stator portion 10 has four coils 11-14 arranged in a generally cross-shaped pattern, and a magnetic sensor 40 positioned at a center location between two of the coils 11, 12. The magnetic sensor 40 is used to detect the position of the rotor portion 30 (i.e. the phase of the motor). Each coil 11-14 is provided with a magnetic yoke 20 formed of a magnetic material. The coils 11-14 and the magnetic sensor 40 are affixed on a circuit board 120 (FIG. 1B). The circuit board 120 is affixed to a casing 102. The cover of the casing 102 is omitted in the drawing.

The rotor portion 30 has four permanent magnets 31-34; the center axis of the rotor portion 30 constitutes a rotating shaft 112. This rotating shaft 112 is supported by a shaft bearing portion 114 (FIG. 1B). The direction of magnetization of the magnets extends in a direction radially outward from the rotating shaft 112. A magnetic yoke 36 is disposed to the outside of the magnets 31-34. This magnetic yoke 36 may be omitted.

FIG. 2A illustrates the positional relationship of a magnet array and a coil array. FIGS. 2B and 2C show the relationship of magnetic sensor output to back electromotive force waveform. As shown in FIG. 2A, the four magnets 31-34 are arranged at constant magnetic pole pitch Pm, with adjacent magnets being magnetized in opposite directions. The coils 11-14 are arranged at constant pitch Pc, with adjacent coils being excited in opposite directions. In this example, the magnetic pole pitch Pm is equal to the coil pitch Pc, and is equivalent to $\pi$ in terms of electrical angle. An electrical angle of $2\pi$ is associated with the mechanical angle or distance of displacement when the phase of the drive signal changes by $2\pi$. In the present embodiment, when the phase of the drive signal changes by $2\pi$, the rotor portion 30 undergoes displacement by the equivalent of twice the magnetic pole pitch Pm.

Of the four coils 11-14, the first and third coils 11, 13 are driven by drive signals of identical phase, while the second and fourth coils 12, 14 are driven by drive signals whose phase is shifted by 180 degrees ($=\pi$) from the drive signals of the first and third coils 11, 13. In ordinary two-phase driving, the phases of the drive signals of the two phases (Phase A and Phase B) would be shifted by 90 degrees ($=\pi/2$); in no instance would they be shifted by 180 degrees ($=\pi$). Also, in most motor drive methods, two drive signals phase-shifted by 180 degrees ($=\pi$) would be viewed as having identical phase. Consequently, the drive method of the motor in the present embodiment can be though of as single-phase driving.

FIG. 2A shows the positional relationship of the magnets 31-34 and the coils 11-14, with the motor at a stop. In the motor of this embodiment, the magnetic yoke 20 provided to each of the coils 11-14 is offset slightly towards the direction of normal rotation of the rotor portion 30, with respect to the center of the coil. Consequently, when the motor stops, the magnetic yoke 20 of each coil will be attracted by the magnets 31-34, bringing the rotor portion 30 to a halt at a position with the magnetic yokes 20 facing the centers of the magnets 31-34. As a result, the motor will come to a halt at a position with the centers of the coils 11-14 offsetted with respect to the centers of the magnets 31-34. The magnetic sensor 40 is also situated at a position offsetted slightly from the boundary between adjacent magnets. The phase at this stop location is denoted as $\alpha$. While the $\alpha$ phase is not zero, it may be a value close to zero (e.g. about 5 to 10 degrees).

FIG. 2B shows an example of waveform of back electromotive force generated by the coils; FIG. 2C shows an example of output waveform by the magnetic sensor 40. The magnetic sensor 40 is able to generate a sensor output SSA substantially similar in shape to the back electromotive force of the coils during motor operation. However, the output SSA of the magnetic sensor 40 has a non-zero value even when the motor is stopped (except in the case where the phase is an integral multiple of $\pi$). The back electromotive force of the coils tends to increase together with motor speed, but the shape of the waveform (sine wave) remains substantially similar. A Hall IC that utilizes the Hall effect may be employed as the magnetic sensor 40. In this example, the sensor output SSA and the back electromotive force Ec are both sine wave waveforms, or waveforms approximating a sine wave. As will be discussed later, the drive control circuitry of this motor utilizes the sensor output SSA to apply to the coils 11-14 voltage of waveform substantially similar in shape to the back electromotive force Ec.

In general, an electric motor functions as an energy conversion device that converts between mechanical energy and electrical energy. The back electromagnetic force of the coils represents mechanical energy of the motor that has been converted to electrical energy. Consequently, where electrical energy applied to the coils is converted to mechanical energy (that is, where the motor is driven), it is possible to drive the motor with maximum efficiency by applying voltage of similar waveform to the back electromagnetic force. As will be discussed below, "similar waveform to the back electromagnetic force" means voltage that generates current flowing in the opposite direction from the back electromagnetic force.

Figure 3:
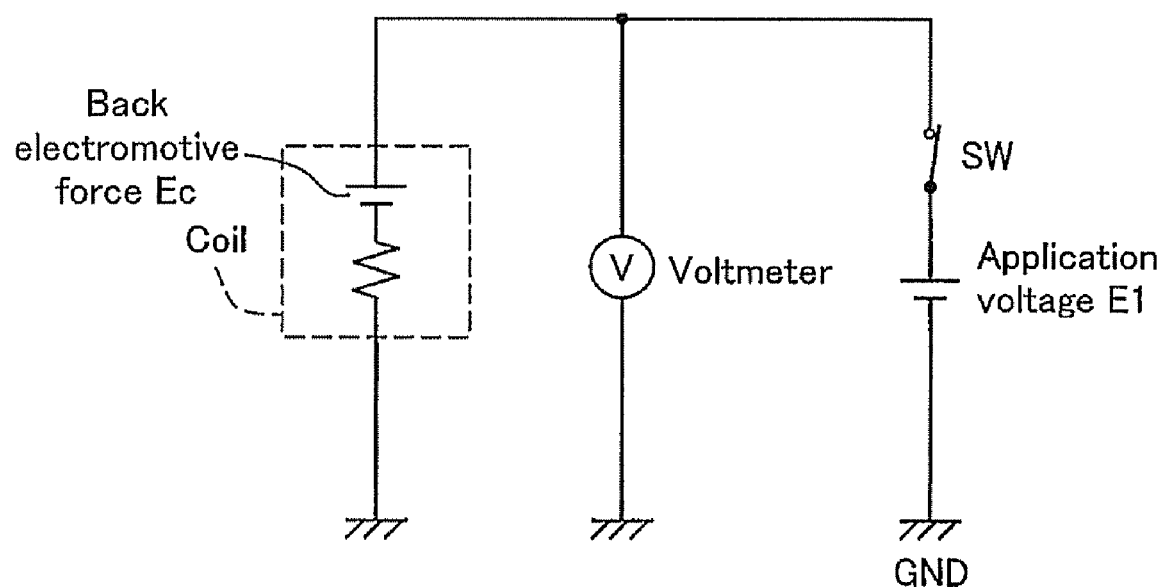
FIG. 3 is a model diagram illustrating the relationship of coil applied voltage and electromotive force.

FIG. 3 is a model diagram illustrating the relationship of applied voltage to the coil and electromotive force. Here, the coil is simulated in terms of back electromotive force Ec and resistance. In this circuit, a voltmeter V is parallel-connected to the application voltage E1 and the coil. When voltage E1 is applied to the motor to drive the motor, back electromotive force Ec is generated with a direction of current flow in opposition to that of the application voltage E1. When a switch SW is opened while the motor is rotating, the back electromotive force Ec can be measured with the voltmeter V. The polarity of the back electromotive force Ec measured with the switch SW open will be the same as the polarity of the application voltage E1 measured with the switch SW closed. The phrase "application of voltage of substantially similar waveform to the back electromagnetic force" herein refers to application of voltage having the same polarity as, and having waveform of substantially similar shape to, the back electromotive force Ec measured by the voltmeter V.

As noted previously, when driving a motor, it is possible to drive the motor with maximum efficiency through application of voltage of waveform similar to that of the back electromagnetic force. It can be appreciated that energy conversion efficiency will be relatively low in proximity to the midpoint (in proximity to 0 voltage) of the sine wave waveform of back electromotive force, while conversely energy conversion efficiency will be relatively high in proximity to the peak of the back electromotive force waveform. Where a motor is driven by applying voltage of waveform similar to that of the back electromotive force, relatively high voltage can be applied during periods of high energy conversion efficiency, thereby improving efficiency of the motor. On the other hand, if the motor is driven with a simple rectangular waveform for example, considerable voltage will be applied in proximity to the position where back electromotive force is substantially 0 (midpoint) so motor efficiency will drop. Also, when voltage is applied during such periods of low energy conversion efficiency, due to eddy current vibration will be produced in directions other than the direction of rotation, thereby creating a noise problem.

As will be understood from the preceding discussion, the advantages of driving a motor by applying voltage of similar waveform to the back electromotive force are that motor efficiency will be improved, and vibration and noise will be reduced.

Figure 4A:
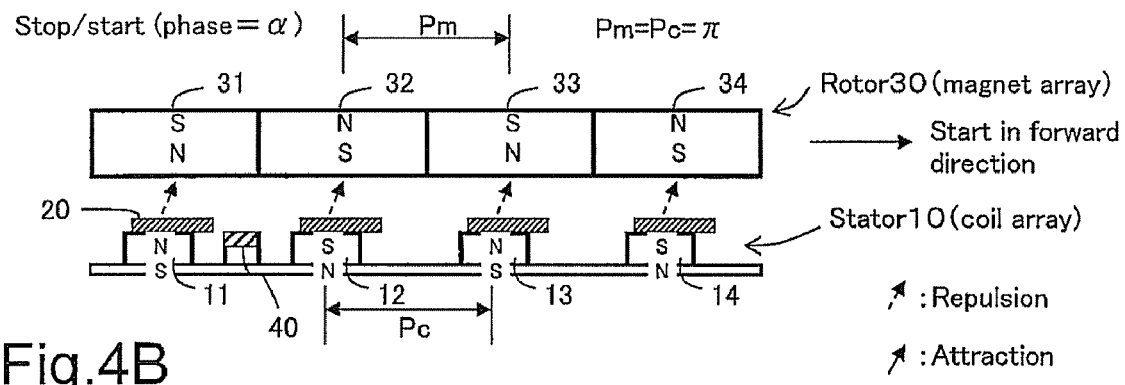
FIGS. 4A to 4E are illustrations depicting forward operation of the motor.

FIGS. 4A to 4E illustrate normal rotation of the motor unit 100. FIG. 4A is the same as FIG. 2A, and depicts the positional relationships of the magnets 31-34 and the coils 11-14 at a stop. In the state depicted in FIG. 4A, excitation of the coils 11-14 produces forces of repulsion between the coils 11-14 and the magnets 31-34, in the direction indicated by the broken arrows. As a result, the rotor portion 30 begins to move in the direction of normal rotation (rightward in the drawing).

Figure 4B:
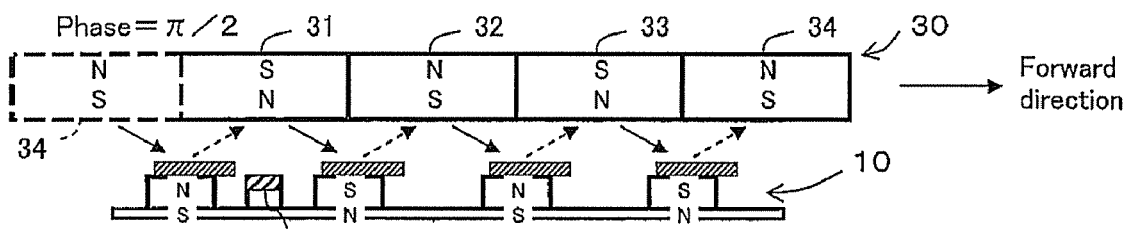
Figure 4C:
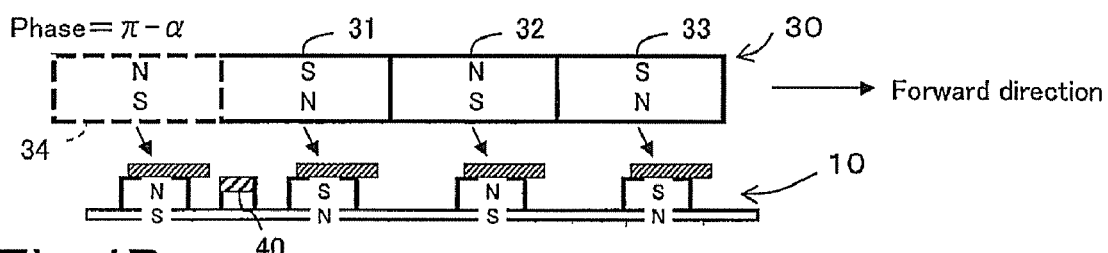
Figure 4D:
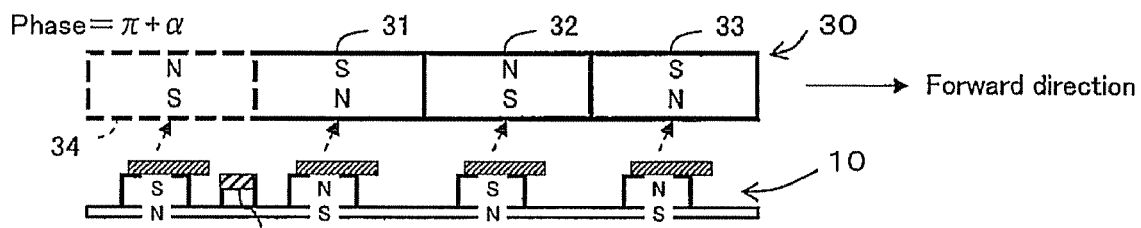
Figure 4E:
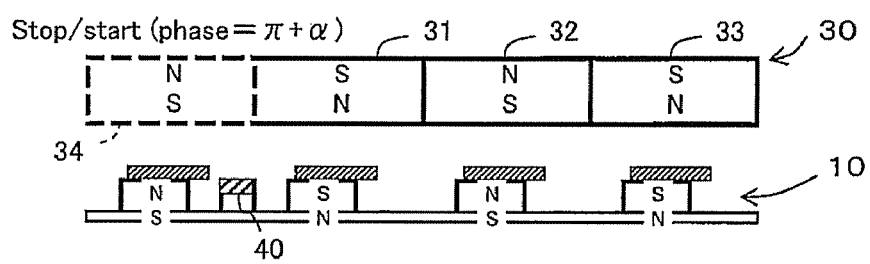

FIG. 4B depicts a state in which the phase has advanced to $\pi/2$. In this state, both forces of attraction (the solid arrows) and forces of repulsion (the broken arrows) are generated, causing strong driving force. FIG. 4C depicts a state in which the phase has advanced to $(\pi-\alpha)$. The coil excitation direction reverses coincident with the timing of the phase going to $\pi$, resulting in the state shown in FIG. 4D. If the motor stops in proximity to the state shown in FIG. 4D, the rotor portion 30 will come to stop at a position like that state shown in FIG. 4E, with the magnetic yokes 20 attracted towards the magnets 31-34. This position is the $(\pi+\alpha)$ phase position. Thus, it will be understood that the motor of the present embodiment will come to a stop at a phase position of $\alpha\pm n\pi$ where n is an integer.

Figure 5A:
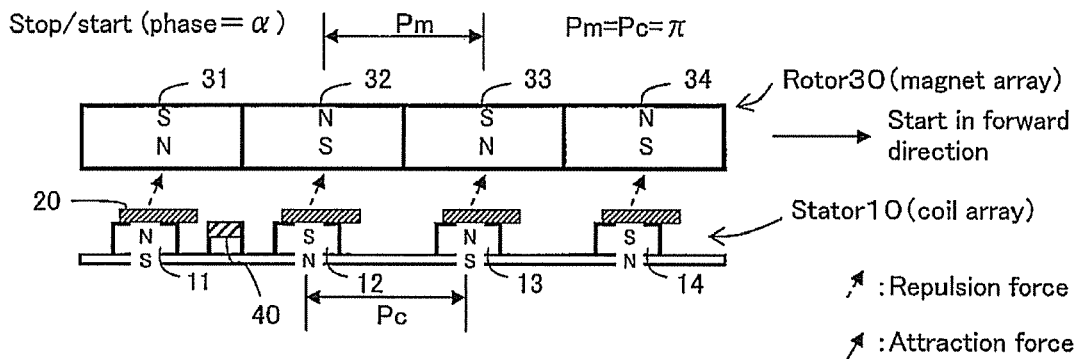
FIGS. 5A to 5E are illustrations depicting reverse operation of the motor.

FIGS. 5A to 5E illustrate reverse rotation of the motor unit 100. FIG. 5A is the same as FIG. 4A, and depicts the motor at a stop. When the coils 11-14 are excited in the opposite direction from FIG. 4A for the purpose of reverse rotation from a stop, forces of attraction (not shown) act between the magnets 31-34 and the coils 11-14. These forces of attraction urge the rotor portion 30 to move in the direction of reverse rotation. However, since the forces of attraction are fairly weak, in some instances they will be overcome by the forces of attraction between the magnets 31-34 and the magnetic yokes 20, and reverse rotation of the rotor portion 30 will not be possible.

Figure 5B:
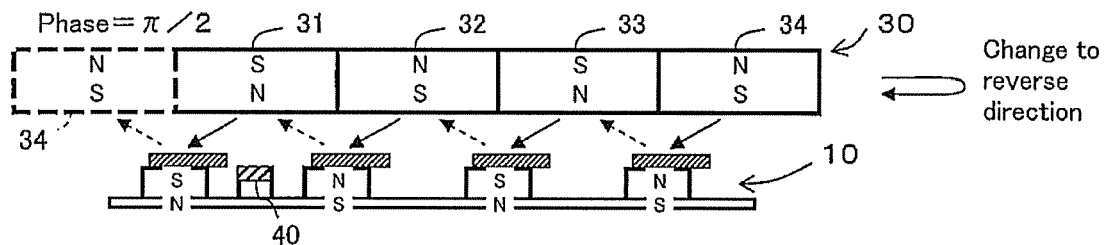
Figure 5C:
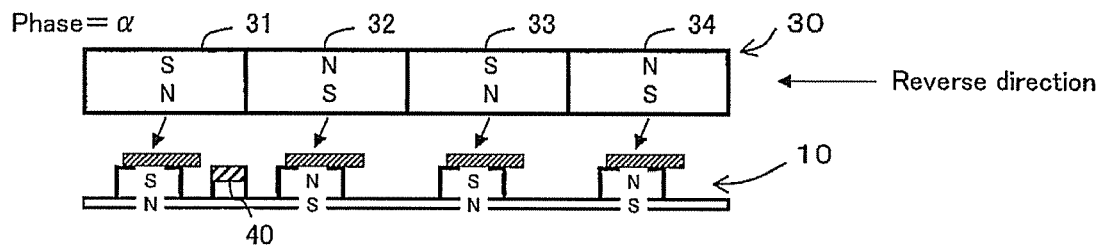
Figure 5D:
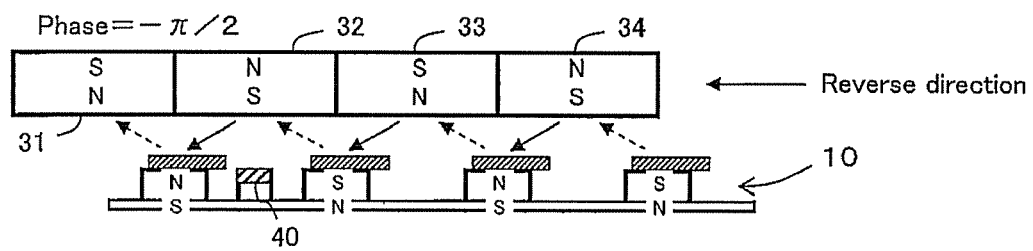
Figure 5E:
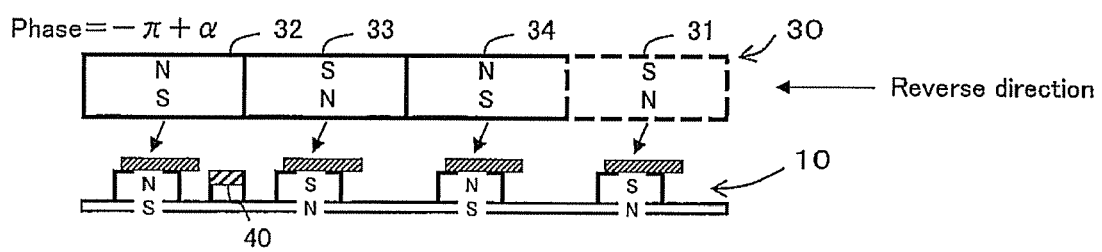

Accordingly, in the present embodiment, even where the motor is to be operated in reverse, at startup the rotor portion 30 will be initially operated in the normal rotation direction as shown in FIG. 5A. Then, once the rotor portion 30 has rotated by a prescribed amount (e.g. when the phase has advanced by about $\pi/2$), the drive signal will reversed and reverse operation initiated as shown in FIG. 5B. Once the rotor portion 30 begins to rotate in reverse in this way, the rotor portion 30 will be able to pass the initial stop position (phase=$\alpha$) due to inertia (FIG. 5C). Subsequently, the coil excitation direction reverses coincident with the timing of the phase going to 0. FIG. 5D depicts the $-\pi/2$ phase state, and FIG. 5E depicts the $-\pi+\alpha$ phase state. If the motor is stopped in proximity to the state of FIG. 5E, the rotor portion 30 will come to a stop at a position of phase=$-\pi+\alpha$ with the magnetic yokes 20 attracted by the magnets 31-34.

Figure 6:
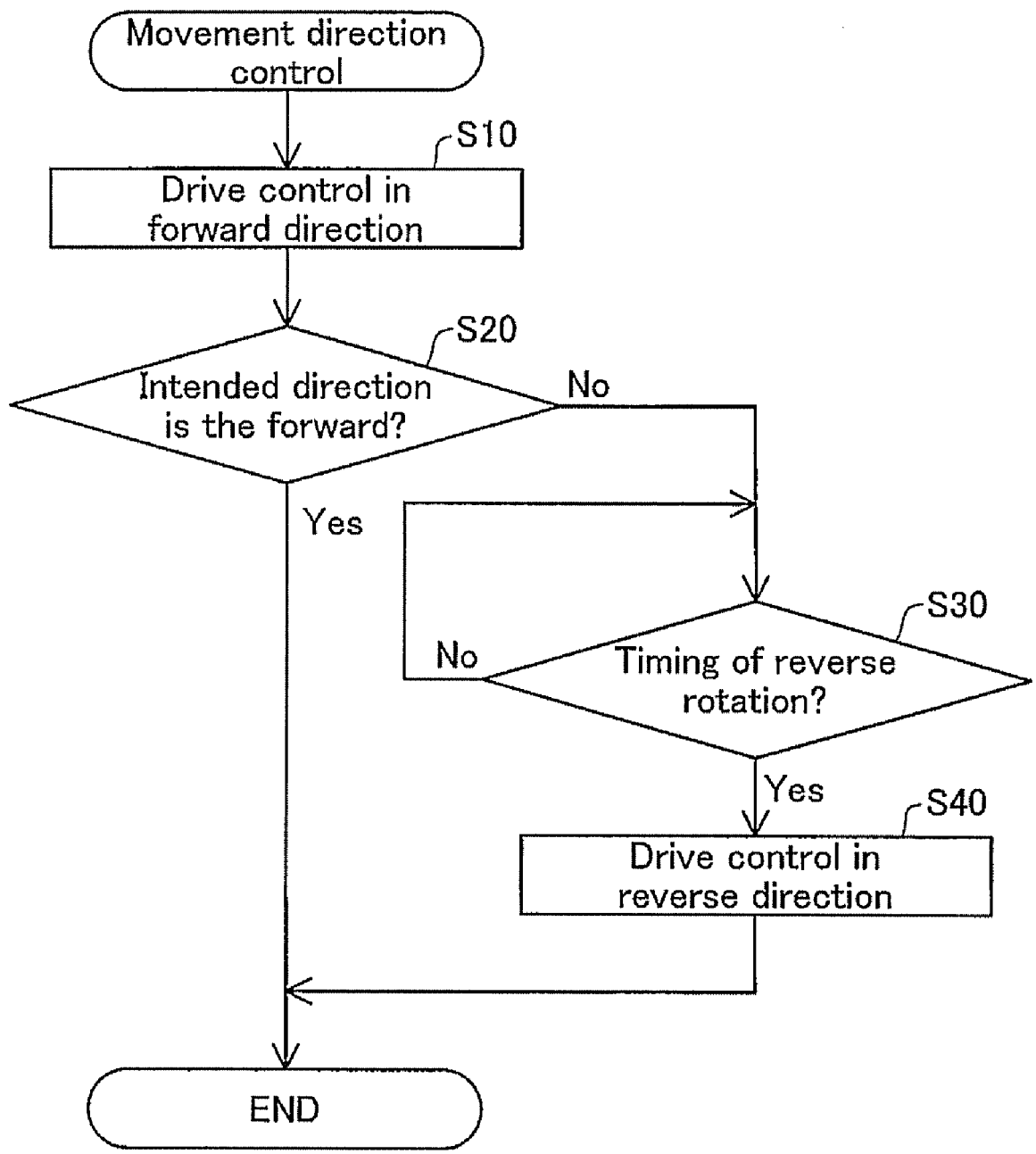
FIG. 6 is a flowchart illustrating a control process of the direction of movement of the motor.

FIG. 6 is a flowchart illustrating the control process of the direction of movement of the motor. This process is executed by a drive control circuit, to be discussed later. First, in Step S10, drive control in the forward direction is initiated. In Step S20, it is determined whether the intended direction of movement is the forward direction. The direction of movement will have been input to the drive control circuit by a human operator prior to Step S10. In the event that the intended direction of movement is the forward direction, drive control in the forward direction will continue on as-is. If on the other hand the intended direction of movement is the reverse direction, in Step S30, the circuit will wait for the prescribed timing of reverse rotation. Once the prescribed timing of reverse rotation is reached, in Step S40, drive control in the reverse direction is initiated.

In this way, with the motor of the present embodiment, the motor will come to a stop at a phase position of $\alpha\pm n\pi$ where $\alpha$ is a prescribed value other than zero or $n\pi$, and n is an integer, and thus deadlock points will be avoided. Accordingly, startup will always be possible without the need for a startup coil. Moreover, with the motor of the embodiment, it is possible to accomplish reverse operation by initiating the motor movement with normal rotation for a prescribed small duration from a stop and subsequently changing to reverse rotation.

B. Configuration of Drive Control Circuit

Figure 7A:
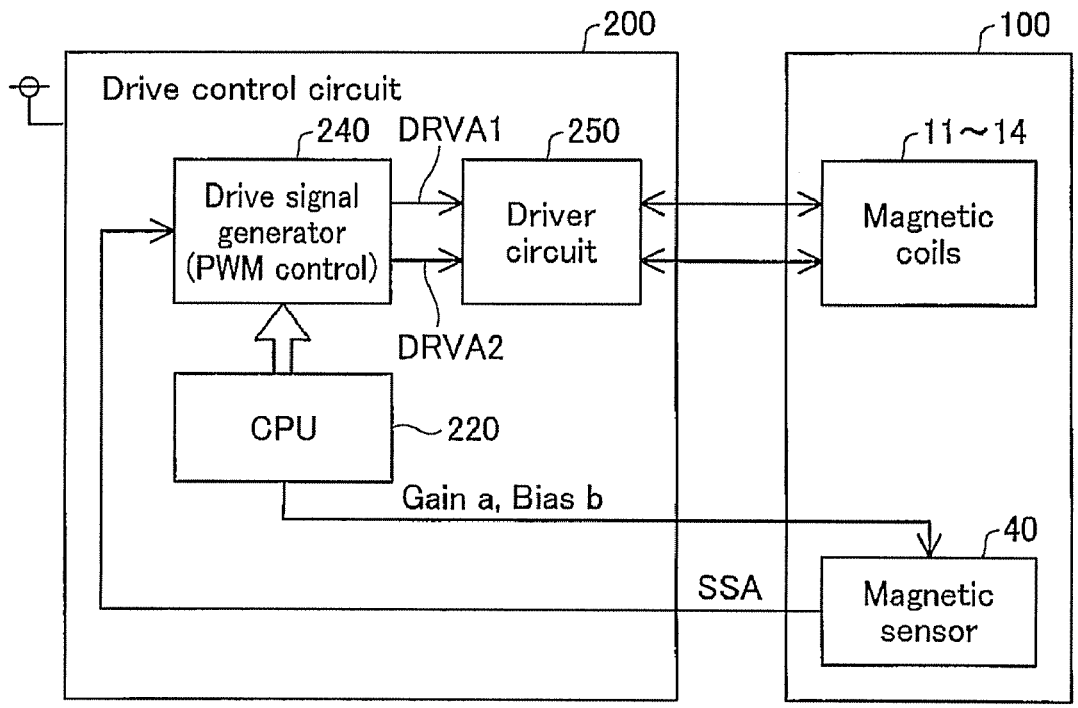
FIG. 7A is a block diagram depicting configuration of a drive control circuit of the brushless motor of the embodiment.

FIG. 7A is a block diagram depicting a configuration of a drive control circuit of the brushless motor of the present embodiment. The drive control circuit 200 has a CPU 220, a drive signal generator 240, and a driver circuit 250. The drive signal generator 240 generates a single-phase drive signal DRVA1, DRVA2 on the basis of the output signal SSA of the magnetic sensor 40 in the motor unit 100. The driver circuit 250 drives the magnetic coils 11-14 in the motor unit 100, in accordance with the single-phase drive signal DRVA1, DRVA2.

Figure 7B:
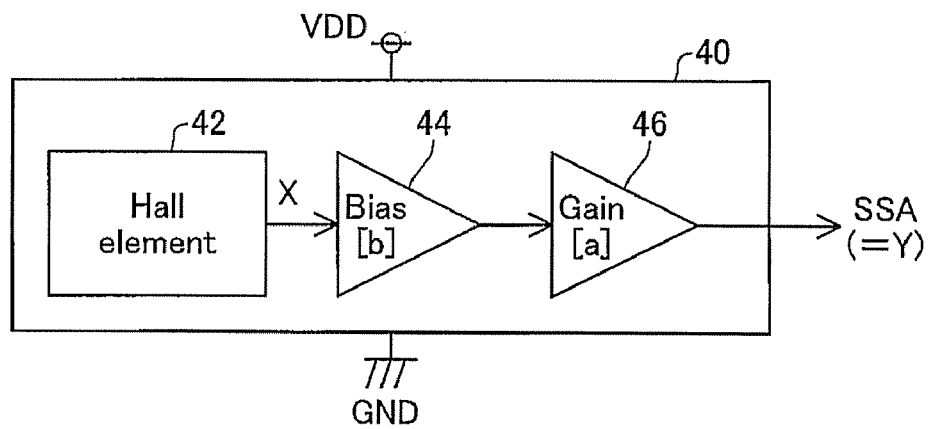
FIG. 7B shows an exemplary internal configuration of the magnetic sensor.

FIG. 7B shows an exemplary internal configuration of the magnetic sensor 40. The magnetic sensor 40 has a Hall element 42, a bias adjuster 44, and a gain adjuster 46. The Hall element 42 measures magnetic flux density X. The bias adjuster 44 adds a bias value b to the output X of the Hall element 42; the gain adjuster 46 performs multiplication by a gain value a. The output SSA (=Y) of the magnetic sensor 40 is given by Expression (1) or Expression (2) below.

$$Y = a \cdot X + b \quad (1)$$

$$Y = a(X + b) \quad (2)$$

The gain value a and the bias value b of the magnetic sensor 40 are set internally in the magnetic sensor 40 by the CPU 220. By setting the gain value a and the bias value b to appropriate values, it is possible to correct the sensor output SSA to a desirable waveform shape.

Figure 8:
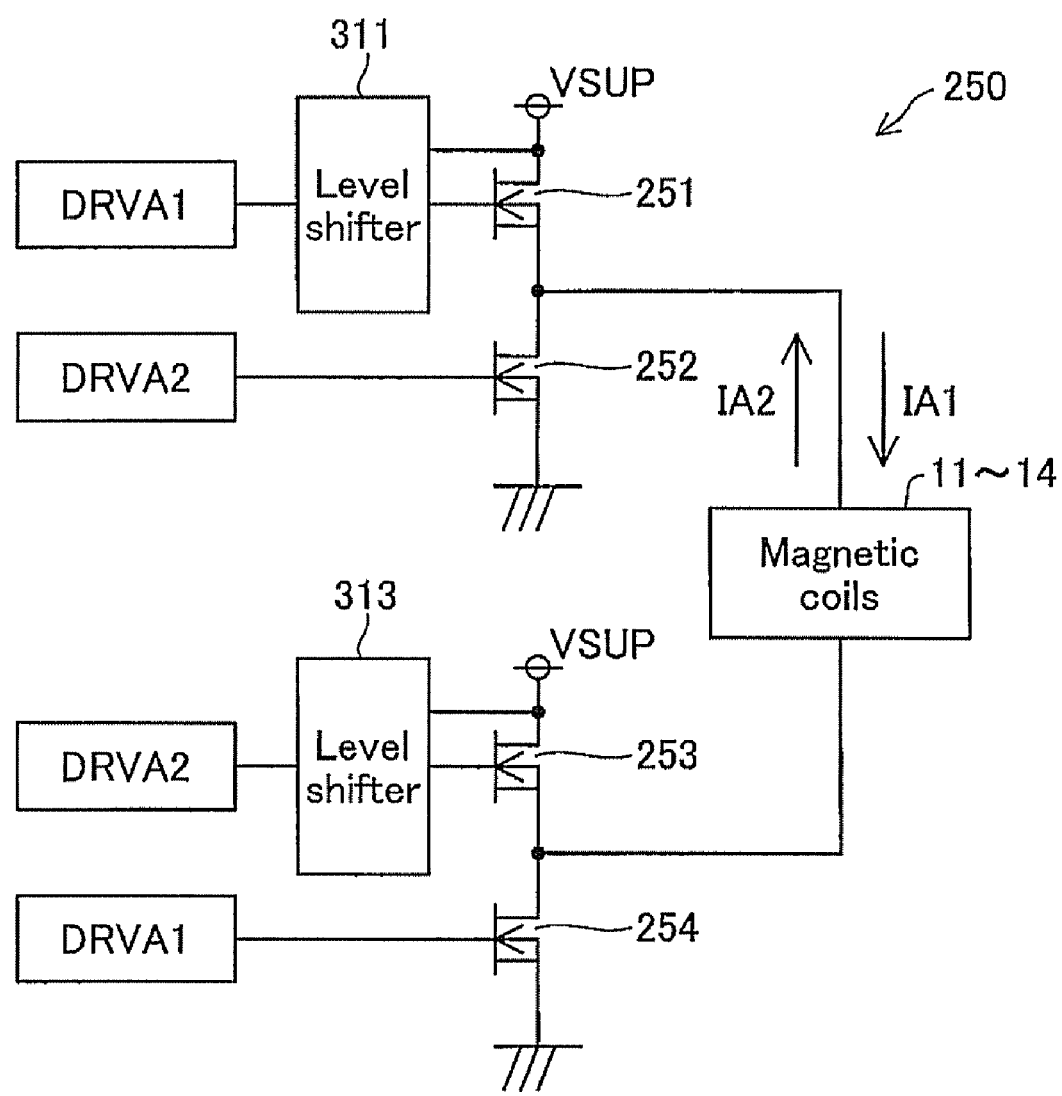
FIG. 8 depicts an internal configuration of a driver circuit.
Figure 10A:
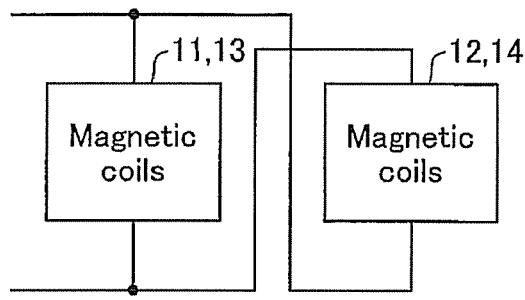
FIGS. 10A-10D are illustrations of various winding configurations for the magnetic coils.
Figure 10B:
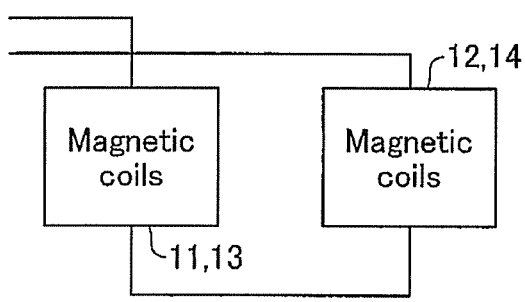
Figure 10C:
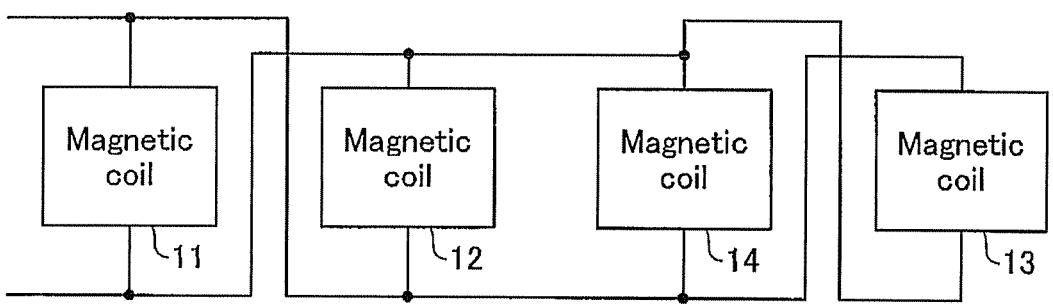
Figure 10D:
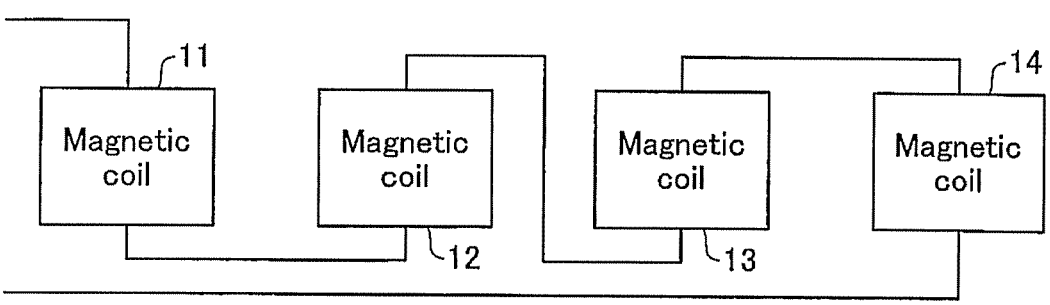

FIG. 8 depicts the internal configuration of the driver circuit 250. This driver circuit 250 has four transistors 251 through 254 which make up an H bridge circuit. Level shifters 311, 313 are disposed in front of the gate electrodes of the upper arm transistors 251, 253. However, the level shifters may be omitted. The transistors 251 through 254 of the driver circuit 250 is turned on and turned off depending on drive signals DRVA1, DRVA2 which function as switching signals, as a result of which supply voltage VSUP is supplied intermittently to the magnet coils 11 through 14. The arrows labeled IA1 and IA2 respectively indicate the direction of current flow with the drive signals DRVA1, DRVA2 at H level. It would also be possible to employ circuits of various other configurations composed of multiple switching elements as the driver circuit.

FIGS. 9A to 9C are illustrations of another configuration and operation of a driver circuit. This driver circuit is composed of a first bridge circuit 250a for use with a first set of magnetic coils 11, 13, and a second bridge circuit 250b for use with a second set of magnetic coils 12, 14. Each of the bridge circuits 250a, 250b includes four transistors 251-254; this configuration is identical to that shown in FIG. 8. In the first bridge circuit 250a, the first drive signal DRVA1 is supplied to the transistors 251, 254, while the second drive signal DRVA2 is supplied to the other transistors 252, 253. In the second bridge circuit 250b on the other hand, the first drive signal DRVA1 is supplied to the transistors 252, 253, while the second drive signal DRVA2 is supplied to the other transistors 251, 254. As a result, operations with the first bridge circuit 250a and the second bridge circuit 250b are the reverse of one another. Consequently, the first set of magnetic coils 11, 13 driven by the first bridge circuit 250a and the second set of magnetic coils 12, 14 driven by the second bridge circuit 250b are phase-shifted by $\pi$ with respect to each other. In the circuit shown in FIG. 8 on the other hand, the coil winding configuration of the first set of coils 11, 13 is the reverse of the coil winding configuration of the second set of coils 12, 14, with the phases of the two sets shifted by $\pi$ through the different winding configurations. Thus, the driver circuit of FIG. 8 and the driver circuit of FIG. 9A share the feature of shifting the phases of the two sets of coils by $\pi$ with respect to each other, and both will realize driving of a 1-phase motor.

FIGS. 10A to 10D are illustrations of various winding configurations for the magnetic coils 11-14. By engineering the winding configuration as in these examples, it is possible for adjacent coils to always be excited in opposite directions.

FIGS. 11A to 11E are illustrations depicting internal configuration and operation of the drive signal generator 240 (FIG. 7A). The drive signal generator 240 includes a basic clock generating circuit 510, a 1/N frequency divider 520, a PWM unit 530, a forward/reverse direction value register 540, a multiplier 550, an encoder 560, an AD converter 570, a voltage control value register 580, an excitation interval signal generator 590, and an excitation ratio signal generator 700.

The basic clock generating circuit 510 is a circuit that generates a clock signal PCL of prescribed frequency, and is composed of a PLL circuit for example. The frequency divider 520 generates a clock signal SDC having a frequency equal to 1/N the frequency of the clock signal PCL. The value of N is set to a prescribed constant. This value of N has been previously established in the frequency divider 520 by the CPU 220. The PWM unit 530 generates the AC single-phase drive signals DRVA1, DRVA2 (FIG. 7A) in response to the clock signals PCL, SDC, a multiplication value Ma supplied by the multiplier 550, a forward/reverse direction value RI supplied by the forward/reverse direction value register 540, a positive/negative sign signal Pa supplied by the encoder 560, and an excitation interval signal Ea supplied by the excitation interval signal generator 590. The excitation interval signal generator 590 generates the excitation interval signal Ea on the basis of an excitation ratio signal Er supplied by the excitation ratio signal generator 700. These operations will be discussed later.

A value RI indicating the direction for motor rotation is established in the forward/reverse direction register 540, by the CPU 220. In the present embodiment, the motor will rotate forward when the forward/reverse direction value RI is L level, and rotate in reverse rotation when H level. The other signals Ma, Pa, Ea supplied to the PWM unit 530 are determined as follows.

The output SSA of the magnetic sensor 40 is supplied to the AD converter 570. This sensor output SSA has a range, for example, of from GND (ground potential) to VDD (power supply voltage), with the middle point thereof (=VDD/2) being the middle point of the output waveform, or the point at which the sine wave passes through the origin. The AD converter 570 performs AD conversion of this sensor output SSA to generate a digital value of sensor output. The output of the AD converter 570 has a range, for example, of FFh to 0h (the "h" suffix denotes hexadecimal), with the median value of 80 h corresponding to the middle point of the sensor waveform.

The encoder 560 converts the range of the sensor output value subsequent to the AD conversion, and sets the value of the middle point of the sensor output value to 0. As a result, the sensor output value Xa generated by the encoder 560 assumes a prescribed range on the positive side (e.g. between +127 and 0) and a prescribed range on the negative side (e.g. between 0 and −127). However, the value supplied to the multiplier 550 by the encoder 560 is the absolute value of the sensor output value Xa; the positive/negative sign thereof is supplied to the PWM unit 530 as the positive/negative sign signal Pa.

The voltage control value register 580 stores a voltage control value Ya established by the CPU 220. This voltage control value Ya, together with the excitation interval signal Ea discussed later, functions as a value for setting the application voltage to the motor. The value Ya can assume a value between 0 and 1.0, for example. Assuming an instance where the excitation interval signal Ea has been set with no non-excitation intervals provided so that all of the intervals are excitation intervals, Ya=0 will mean that the application voltage is zero, and Ya=1.0 will mean that the application voltage is at maximum value. The multiplier 550 performs multiplication of the voltage control value Ya and the sensor output value Xa output from the encoder 560 and conversion to an integer; the multiplication value Ma thereof is supplied to the PWM unit 530.

FIGS. 11B to 11E depict operation of the PWM unit 530 in instances where the multiplication value Ma takes various different values. Here, it is assumed that there are no non-excitation intervals, so that all intervals are excitation intervals. The PWM unit 530 is a circuit that, during one period of the clock signal SDC, generates one pulse with a duty factor of Ma/N. Specifically, as shown in FIGS. 11B to 11E, the pulse duty factor of the single-phase drive signals DRVA1, DRVA2 increases in association with increase of the multiplication value Ma. The first drive signal DRVA1 is a signal that generates a pulse only when the sensor output SSA is positive and the second drive signal DRVA2 is a signal that generates a pulse only when the sensor output SSA is positive; in FIGS. 11B to 11E, both are shown together. For convenience, the second drive signal DRVA2 is shown in the form of pulses on the negative side.

Figures 12A, 12B, 12C:
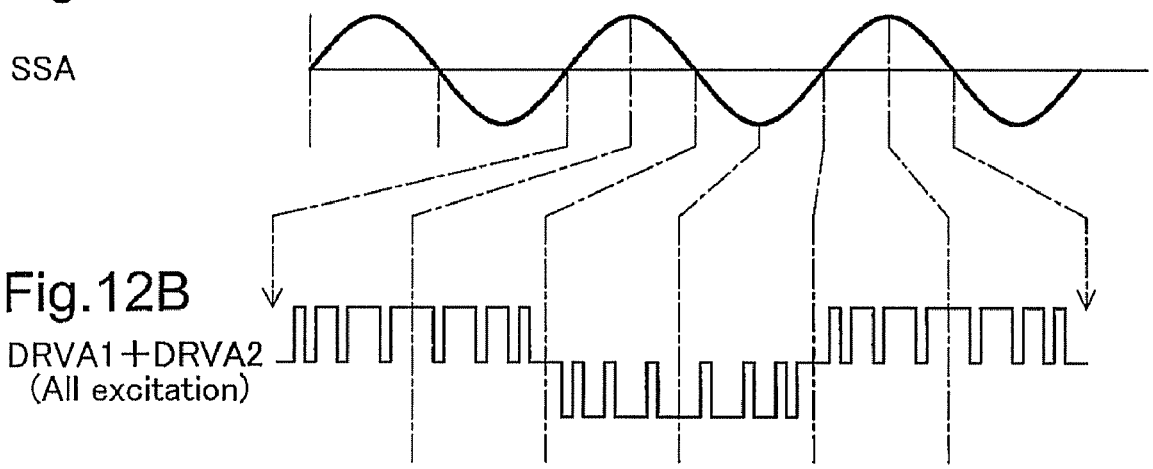
FIGS. 12A to 12C are illustrations depicting correspondence relationships of sensor output waveform and waveform of drive signals generated by the PWM unit.

FIGS. 12A to 12C depict correspondence between sensor output waveform and waveform of the drive signals generated by the PWM unit 530. In the drawing, "Hiz" denotes a state of high impedance where the magnetic coils are not excited. As described in FIGS. 11B to 11E, the single-phase drive signals DRVA1, DRVA2 are generated by PWM control using the analog waveform of the sensor output SSA. Consequently, using these single-phase drive signals DRVA1, DRVA2 it is possible to supply to the coils effective voltage that exhibits changes in level corresponding to change in the sensor outputs SSA, SSB.

The PWM unit 530 is constructed such that drive signals DRVA1, DRVA2 are output only during the excitation intervals indicated by the excitation interval signal Ea supplied by the excitation interval signal generator 590, with no drive signals DRVA1, DRVA2 being output at intervals except for the excitation intervals (non-excitation intervals). FIG. 12C depicts drive signal waveforms produced in the case where excitation intervals EP and non-excitation intervals NEP have been established by the excitation interval signal Ea. During the excitation intervals EP, the drive signal pulses of FIG. 12B are generated as is; during the non-excitation intervals NEP, no pulses are generated. By establishing excitation intervals EP and non-excitation intervals NEP in this way, voltage will not be applied to the coils in proximity to the middle point of the back electromotive force waveform (i.e. in proximity to the middle point of the sensor output), thus making possible further improvement of motor efficiency. Preferably the excitation intervals EP will be established at intervals symmetric about the peak point of the back electromotive force waveform; and preferably the non-excitation intervals NEP will be established in intervals symmetric about the middle point (center) of the back electromotive force waveform.

As discussed previously, if the voltage control value Ya is set to a value less than 1, the multiplication value Ma will be decreased in proportion to the voltage control value Ya. Consequently, effective adjustment of application voltage is possible by the voltage control value Ya as well.

As will be apparent from the preceding discussion, with the motor of the present embodiment, it is possible to adjust the application voltage using both the voltage control value Ya and the excitation interval signal Ea. In preferred practice, relationships between the desired application voltage, the voltage control value Ya, and excitation interval signal Ea, will be stored in advance in table format in memory in the drive control circuit 200 (FIG. 7A). By so doing, when the drive control circuit 200 has received a target value for the desired application voltage from the outside, it will be possible for the CPU 220 in response to the target value to set the voltage control value Ya in the voltage control value register 580. Adjustment of application voltage does not require the use of both the voltage control value Ya and the excitation interval signal Ea, and it would be acceptable to use either one of them instead.

Figure 13:
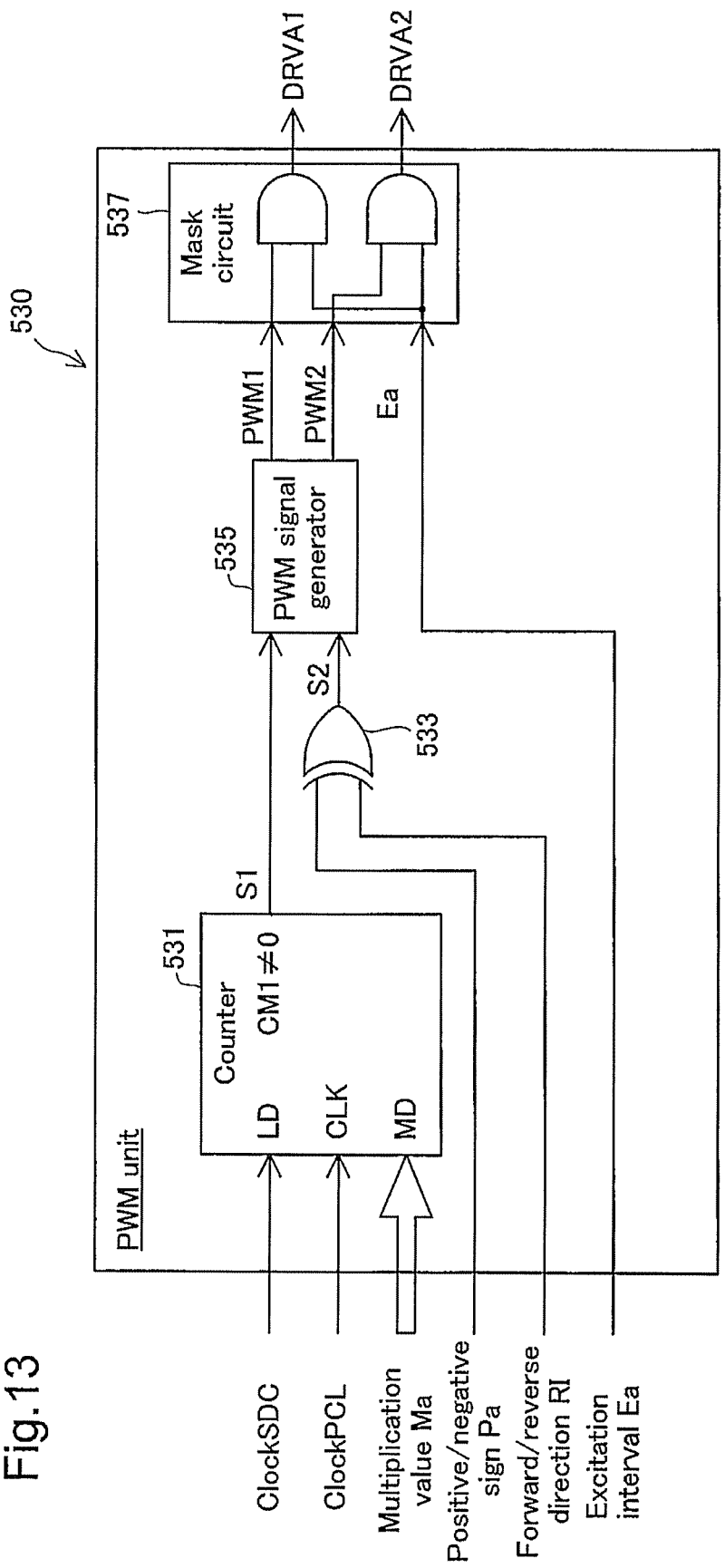
FIG. 13 is a block diagram depicting an example of internal configuration of the PWM unit.

FIG. 13 is a block diagram depicting an example of internal configuration of the PWM unit 530 (FIG. 11A). The PWM unit 530 has a counter 531, an EXOR circuit 533, a PWM signal generator 535, and a mask circuit 537. Their operation will be described below.

Figure 14:
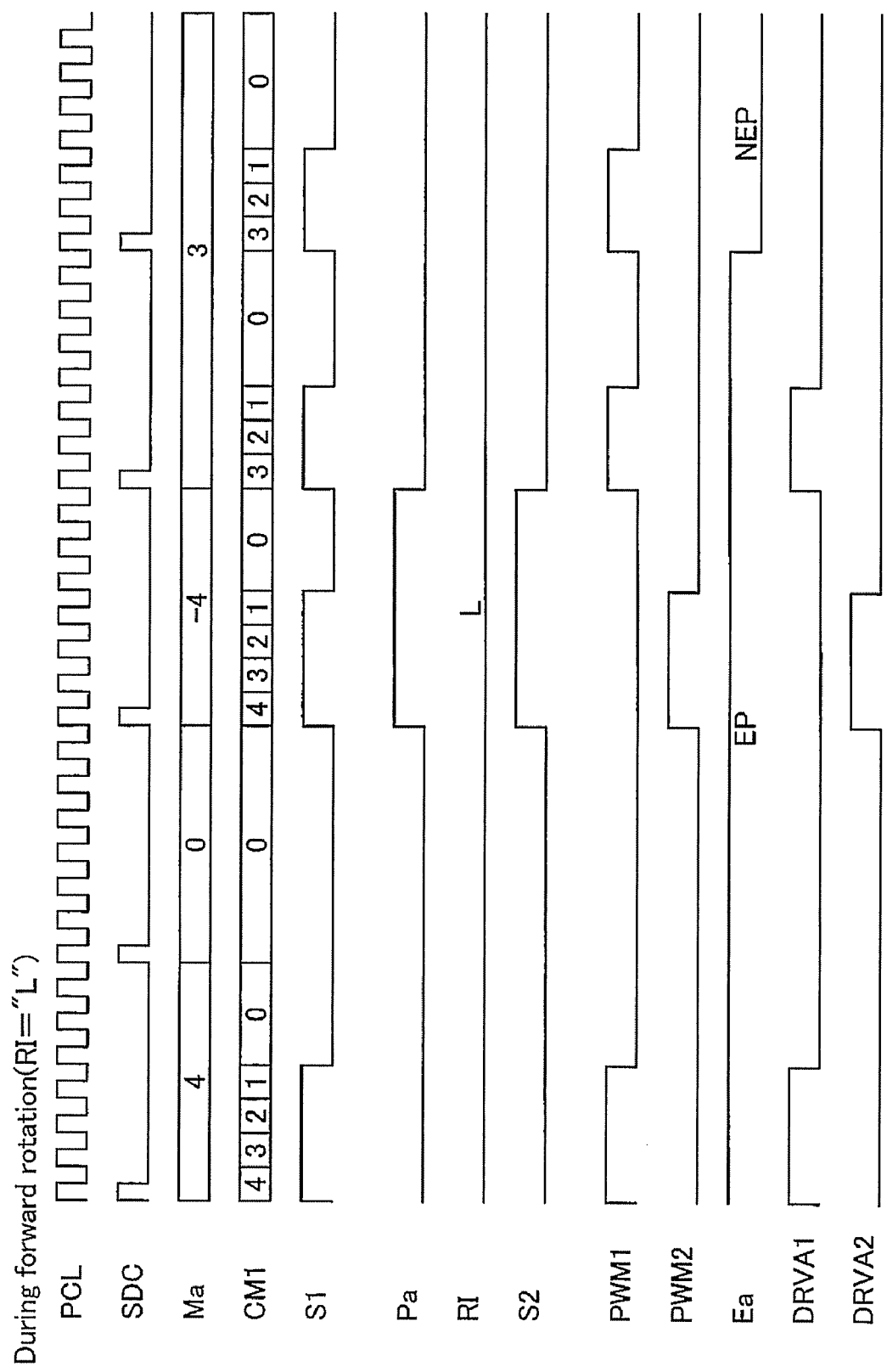
FIG. 14 is a timing chart depicting operation of the PWM unit during forward rotation of the motor.

FIG. 14 is a timing chart depicting operation of the PWM unit 530 during forward rotation of the motor. In FIG. 14 are shown the two clock signals PCL and SDC, the multiplication value Ma, the count value CM1 in the counter 531, the output S1 of the counter 531, the positive/negative sign signal Pa, the forward/reverse direction value RI, the output S2 of the EXOR circuit 533, the output signals PWM1, PWM2 of the PWM signal generator 535, the excitation interval signal Ea, and the output signals DRVA1, DRVA2 of the mask circuit 537. For each one cycle of the clock signal SDC, the counter 531 repeats the operation of counting down the count value CM1 to 0 in synchronization with the clock signal PCL. The initial value of the count value CM1 is set to the multiplication value Ma. In FIG. 14 for convenience in illustration, negative multiplication values Ma are shown as well; however, the counter 531 uses the absolute values |Ma| thereof. The output S1 of the counter 531 is set to High level when the count value CM1 is not 0, and drops to Low level when the count value CM1 is 0.

The EXOR circuit 533 outputs a signal S2 that represents the exclusive OR of the positive/negative sign signal Pa and the forward/reverse direction value RI. In the case of forward rotation of the motor, the forward/reverse direction value RI is Low level. Consequently, the output S2 of the EXOR circuit 533 is a signal identical to the positive/negative sign signal Pa. The PWM signal generator 535 generates the PWM signals PWM1, PWM2 from the output S1 of the counter 531 and the output S2 of the EXOR circuit 533. Specifically, in the output S1 of the counter 531, the signal during intervals in which the output S2 of the EXOR circuit 533 is Low level is output as the first PWM signal PWM1, and the signal during intervals in which the output S2 is High level is output as the second PWM signal PWM2. The mask circuit 537 includes two AND circuits; it outputs a drive signal DRVA1 representing the logical AND of the excitation interval signal Ea and the PWM signal PWM1, and a drive signal DRVA2 representing the logical AND of the excitation interval signal Ea and the PWM signal PWM2. In proximity to the right edge in FIG. 14, the excitation interval signal Ea falls to Low level, thereby establishing a non-excitation interval NEP. Consequently, during this non-excitation interval NEP, neither of the drive signals DRVA1, DRVA2 is output, and a state of high impedance is maintained.

The PWM signal generator 535 (FIG. 13) corresponds to the original drive signal generator in the present invention; and the two PWM signals PWM1, 2 correspond to the original drive signals in the present invention.

FIG. 15 is a timing chart depicting operation of the PWM unit 530 during reverse rotation of the motor. During reverse rotation of the motor, the forward/reverse direction value RI is set to High level. As a result, the two drive signals DRVA1, DRVA2 switch relative to FIG. 14; it is appreciated that the motor runs in reverse as a result.

Figure 16A:
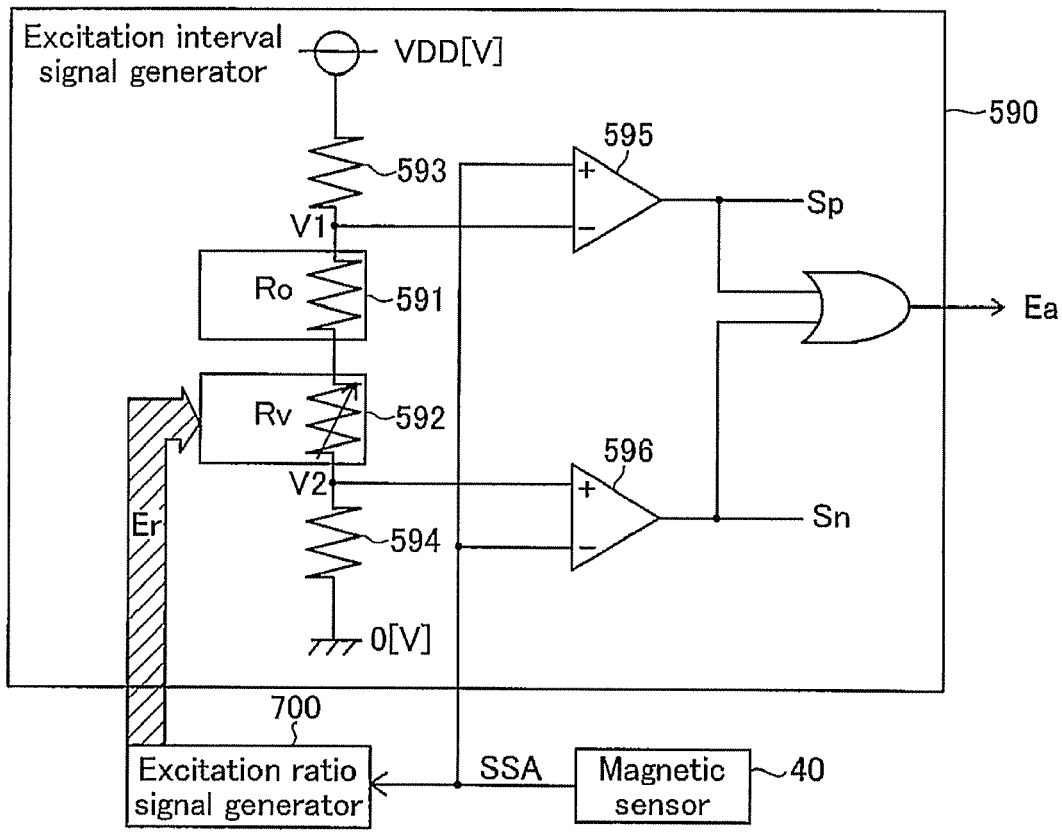
FIGS. 16A and 16B are illustrations depicting internal configuration and operation of the excitation interval signal generator.
Figure 16B:
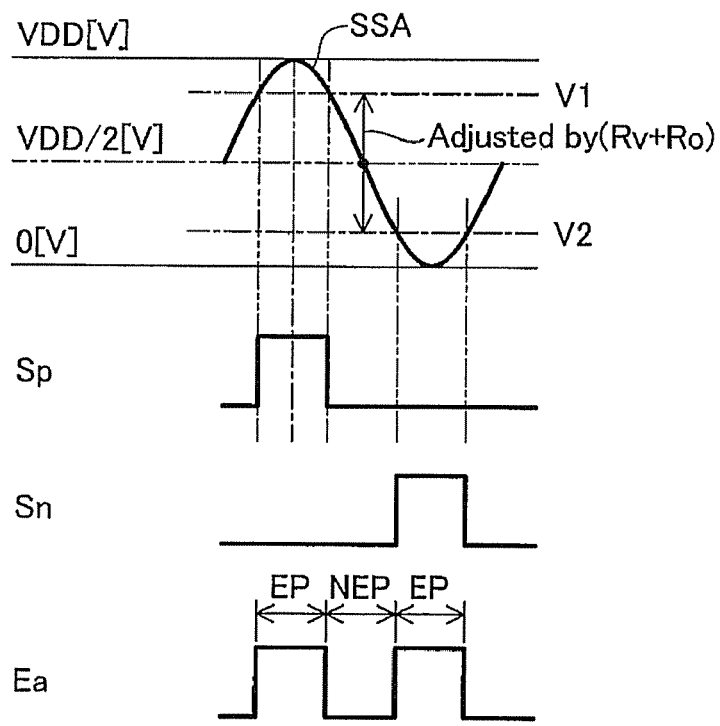

FIGS. 16A and 16B are illustrations depicting internal configuration and operation of the excitation interval signal generator 590. The excitation interval signal generator 590 has an offset resistor 591, an electronic variable resistor 592, two resistors 593, 594 with mutually equal resistance values, two voltage comparators 595, 596, and an OR circuit 598. The resistance Rv of the electronic variable resistor 592 is set on the basis of the excitation ratio signal Er supplied by the excitation ratio signal generator 700, to be discussed later. The voltages V1, V2 at either terminal of the series-connected offset resistor 591 and electronic variable resistor 592 are presented to one of the input terminals of the voltage comparators 595, 596. The sensor output SSA is presented to the other input terminal of the voltage comparators 595, 596. The output signals Sp, Sn of the voltage comparators 594, 596 are input to the OR circuit 598. The excitation interval signal Ea which is the output of the OR circuit 598 is used to differentiate excitation intervals EP and non-excitation intervals NEP.

FIG. 16B depicts operation of the excitation interval signal generator 590. The voltages V1, V2 at the terminals of the electronic variable resistor 592 and the offset resistor 591 are changed by adjusting the variable resistance Rv of the electronic variable resistor 592. Specifically, the terminal voltages V1, V2 are set in such a way that differences between the terminal voltages V1, V2 and the median value of the voltage range (=VDD/2) of the sensor output SSA are equal. This may be accomplished because the resistance values R1 and R2 of the two resistors 593, 594 have equal magnitude. In the event that the sensor output SSA is higher than the first voltage V1, the output Sp of the first voltage comparator 595 goes to High level, whereas in the event that the sensor output SSA is lower than the second voltage V2, the output Sn of the second voltage comparator 596 goes to High level. The excitation interval signal Ea is a signal which takes the logical sum of these output signals Sp, Sn. Consequently, as shown at bottom in FIG. 16B, the excitation interval signal Ea can be used as a signal for indicating excitation intervals EP and non-excitation intervals NEP. Setting of the excitation interval EP and the non-excitation interval NEP is carried out through adjustment of the variable resistance Rv on the basis of the excitation ratio signal Er supplied by the excitation ratio signal generator 700.

Figure 17A:
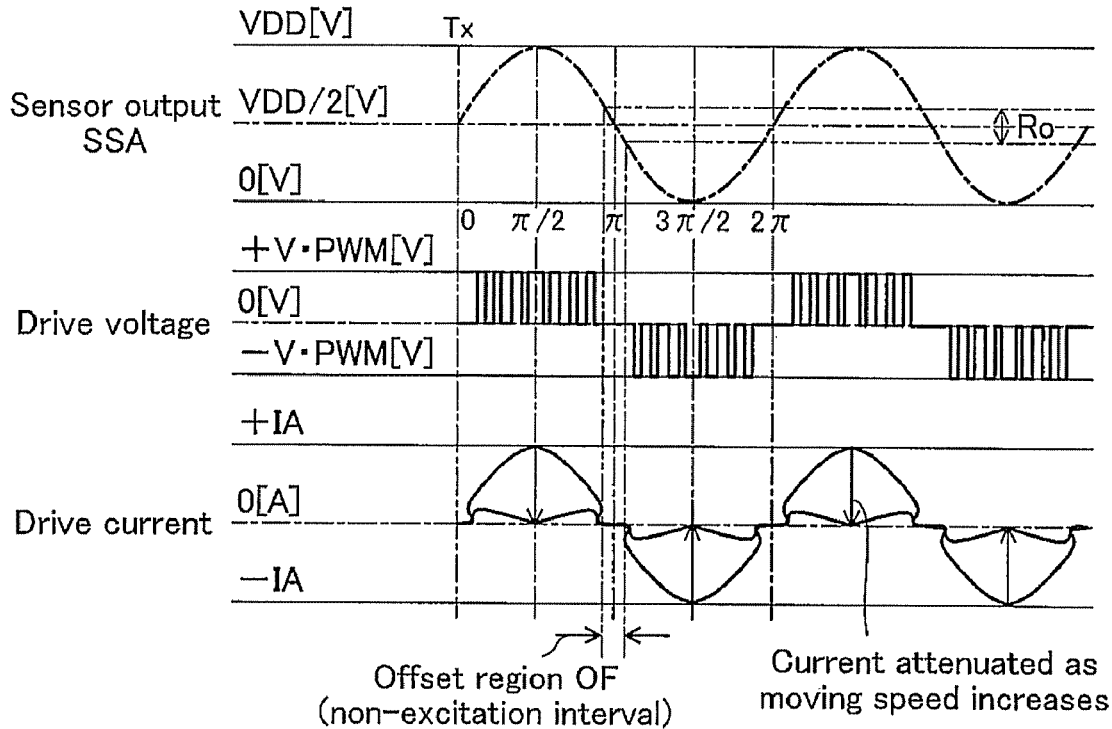
FIG. 17A depicts several signal waveforms at startup of the motor.

FIG. 17A depicts several signal waveforms at startup of the motor. When the motor is started up from the stopped state, higher output will be required in comparison to the steady state in which rotation speed is constant. Consequently, at motor startup it is preferable to set variable resistance Rv to 0Ω, and to set all intervals except for a non-excitation interval produced by the offset resistor 591 (hereinafter also termed "offset region OF") as excitation intervals EP. The offset region OF is provided for the purpose of preventing the drive current from flowing in the reverse direction in proximity to the median value of the voltage range in the event of variability in the output SSA of the magnetic sensor 40. In preferred practice, after motor startup the variable resistance Rv increases gradually as rotation speed approaches the steady state speed. The reason for doing so is that the non-excitation interval NEP can expand gradually. The excitation ratio signal Er for adjusting the variable resistance Rv will be discussed later.

Figure 17B:
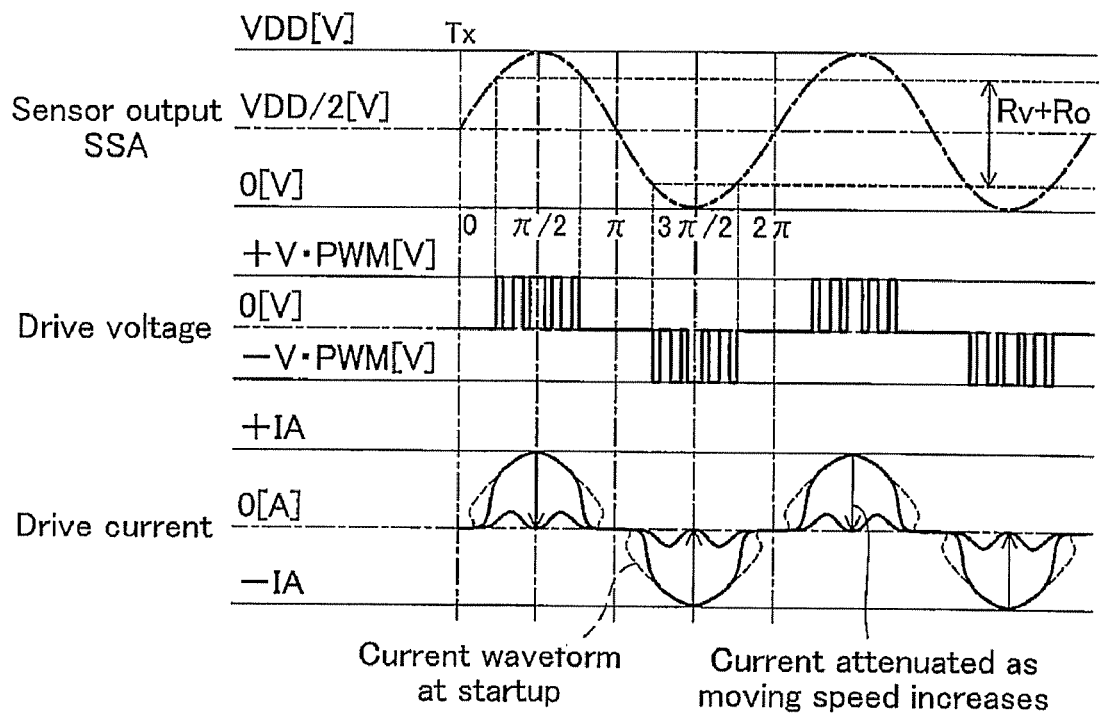
FIG. 17B depicts several signal waveforms during constant speed rotation of the motor.

FIG. 17B depicts several signal waveforms during constant speed rotation of the motor. The output required with the motor rotating at constant speed may be low in comparison with the output required when accelerating from startup. Consequently, when the motor is rotating at constant speed, it is possible to reduce power consumption without any effect on rotation of the motor, despite expansion of the non-excitation interval NEP by setting the variable resistance Rv to increasingly larger values. As shown in FIGS. 17A and 17B, drive current flowing to the coils 11 through 14 is attenuated as rotation speed increases.

Figure 18:
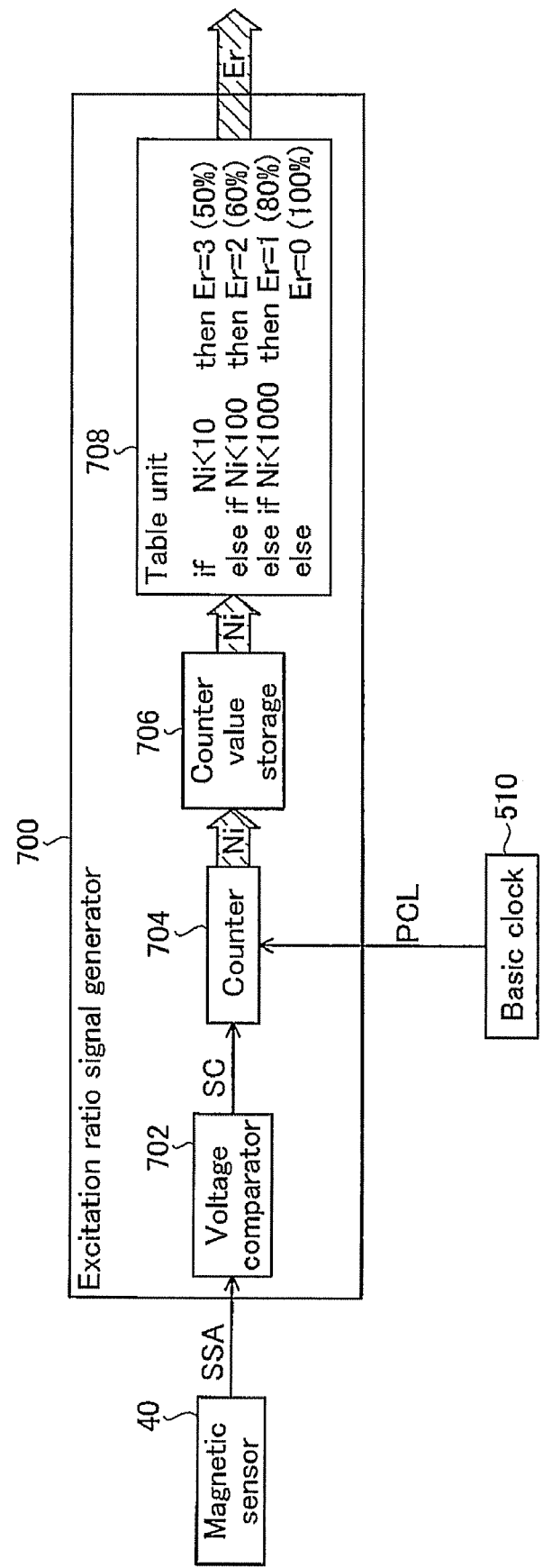
FIG. 18 is an illustration depicting internal configuration of an excitation ratio signal generator.

FIG. 18 is an illustration depicting internal configuration of the excitation ratio signal generator 700. In FIG. 18, the magnetic sensor 40 and the basic clock generating circuit 510 are depicted in addition to the excitation ratio signal generator 700. The excitation ratio signal generator 700 includes a voltage comparator 702, a counter 704, a counter value storage 706, and a table unit 708. These components operate in the manner described below.

Figure 19:
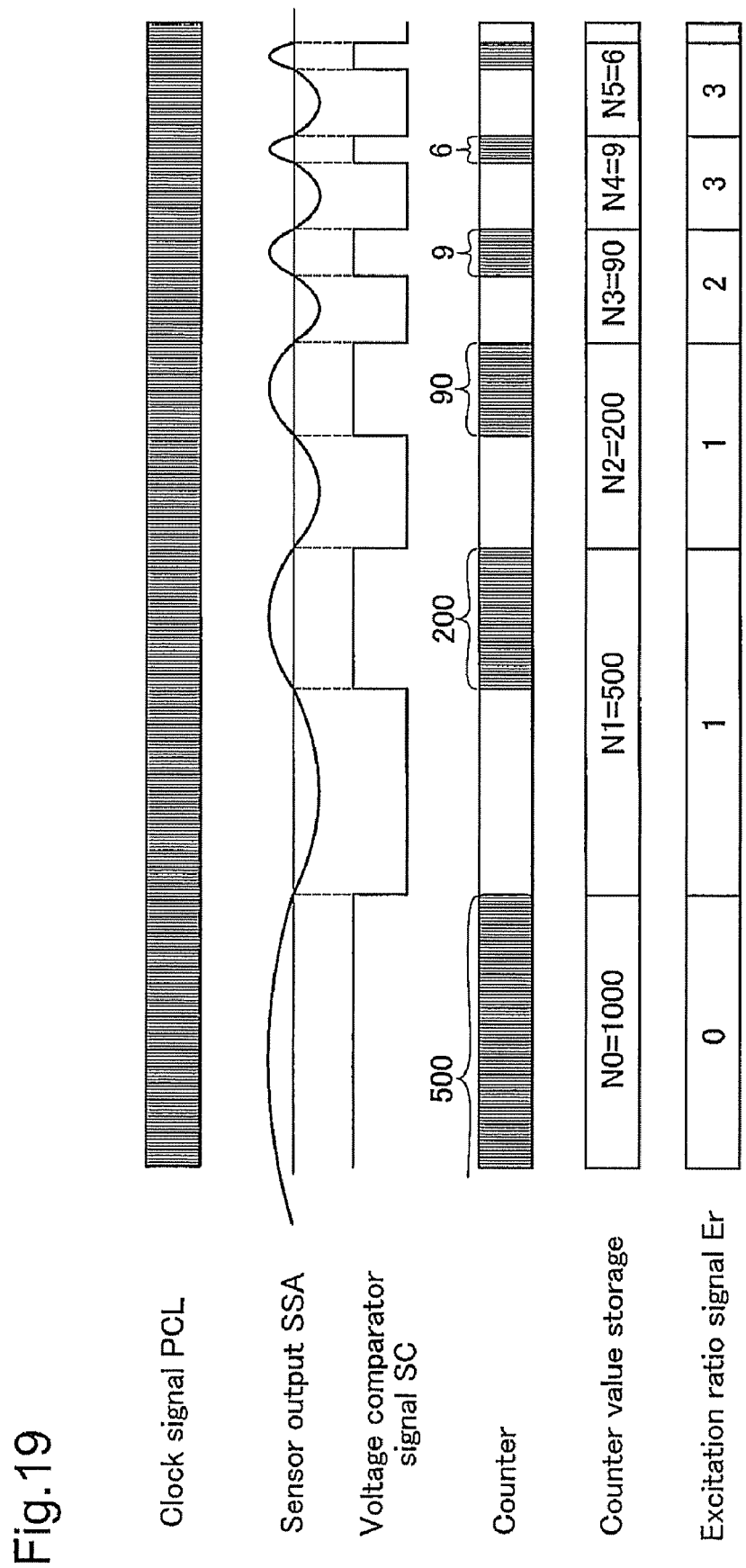
FIG. 19 is a timing chart depicting operation of the excitation ratio signal generator.

FIG. 19 is a timing chart depicting operation of the excitation ratio signal generator 700. The voltage comparator 702 compares the signal SSA (analog) from the magnetic sensor 40 with a reference signal, and generates a voltage comparator signal SC which is a digital signal. Preferably, the level of this reference signal is set to equal the median value of levels of the sensor signal SSA. On the basis of the clock signal PCL provided by the basic clock generating circuit 510, the counter 704 counts the number of clock pulses during the interval for which the voltage comparator signal SC is High level. Once the High level interval of the voltage comparator signal SC ends, the counter 704 saves the current counter value Ni (where i is cycle number) to the counter value storage 706. The counter 704 may finish counting a High level interval when the counter value N goes above a prescribed value (e.g. N=1000). This reason is described as follows. In the table unit 708 described later, the value of the excitation ratio signal Er is determined depending on the value of the counter values Ni. So, in the event that the counter value Ni goes above a prescribed value, the value of the excitation ratio signal Er dose not change despite counting beyond the prescribed value.

The table unit 708 (FIG. 18) determines the value of the excitation ratio signal Er depending on the counter value Ni stored in the counter value storage 706, and outputs the excitation ratio signal Er. In the present embodiment, the value of the excitation ratio signal Er is set such that Er=3 where Ni<10; Er=2 where 10≦Ni<100; Er=1 where 100≦Ni<1000; and Er=0 where 1000≦Ni. The excitation ratio signal Er generated by the table unit 708 is supplied to the electronic variable resistor 592 of the excitation interval signal generator 590 (FIG. 16A). The excitation interval EP and the non-excitation interval NEP are then determined by changing the variable resistance Rv of the electronic variable resistor 592.

Figure 20:
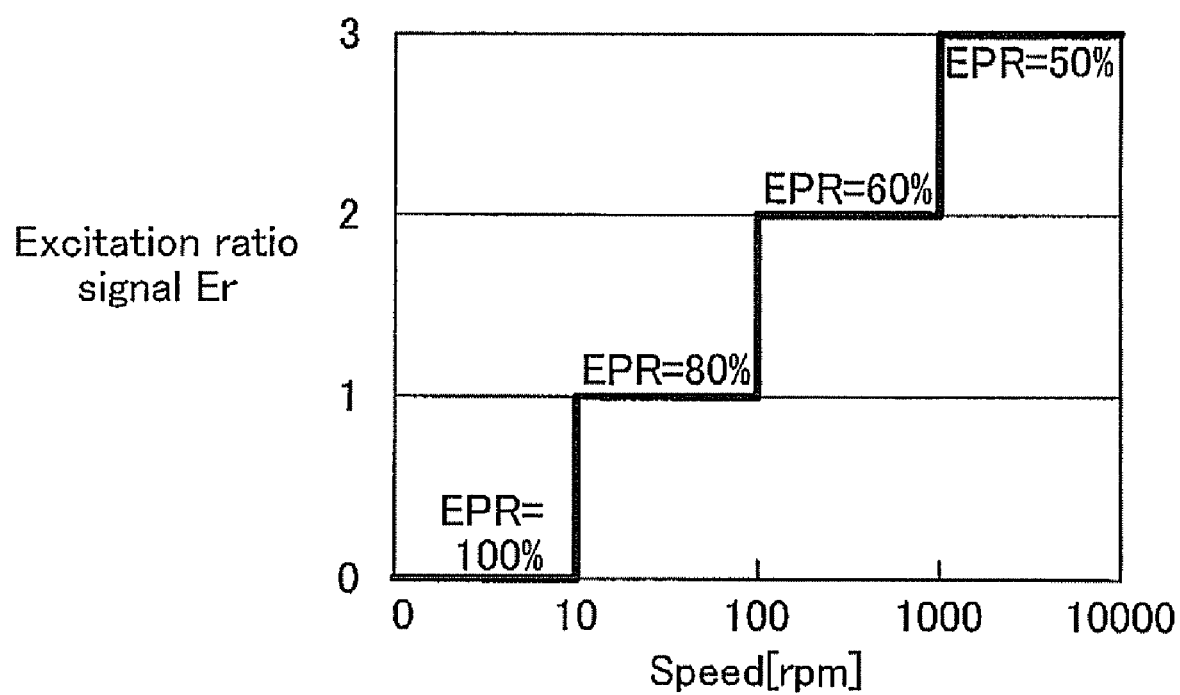
FIG. 20 depicts the relationship between motor speed (rpm) and an excitation ratio signal Er.

FIG. 20 depicts the relationship between motor speed (rpm) and the excitation ratio signal Er. There is a correlation between motor speed and the counter values Ni. Then, the motor speed and the counter values Ni correspond to the one to one. The value of the excitation ratio signal Er is associated with an excitation interval ratio EPR. This excitation interval ratio EPR is the ratio of excitation intervals EP where the variable resistance Rv is changed, to excitation intervals EP where the variable resistance Rv is set to 0Ω. Where the excitation ratio signal Er=0, the variable resistance Rv is set to 0Ω and the excitation interval ratio EPR is 100%. The value of variable resistance Rv of the electronic variable resistor 592 is set such that as the value of the excitation ratio signal Er supplied by the excitation ratio signal generator 700 increases from 1 to 2 to 3, the excitation interval ratio EPR decreases from 80% to 60% to 50%. That is, the variable resistance Rv is established in such a way that the excitation period ratio becomes smaller as motor speed increases closer to the steady state.

Figure 21A:
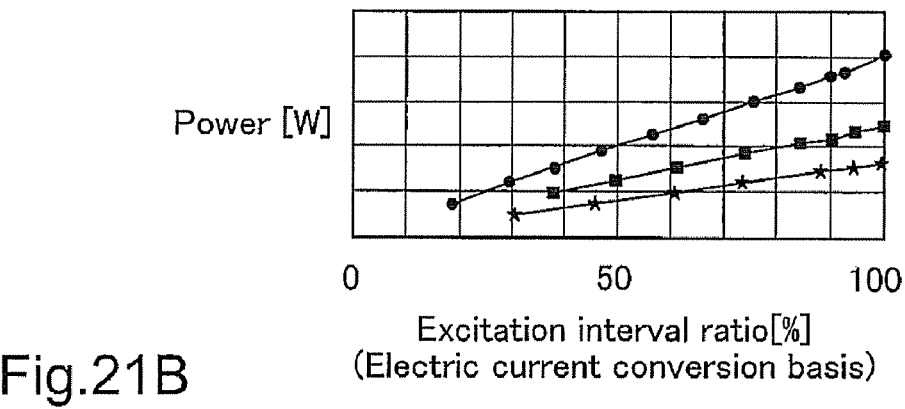
FIGS. 21A to 21C are graphs illustrating the effect of changing the excitation interval ratio EPR.
Figure 21B:
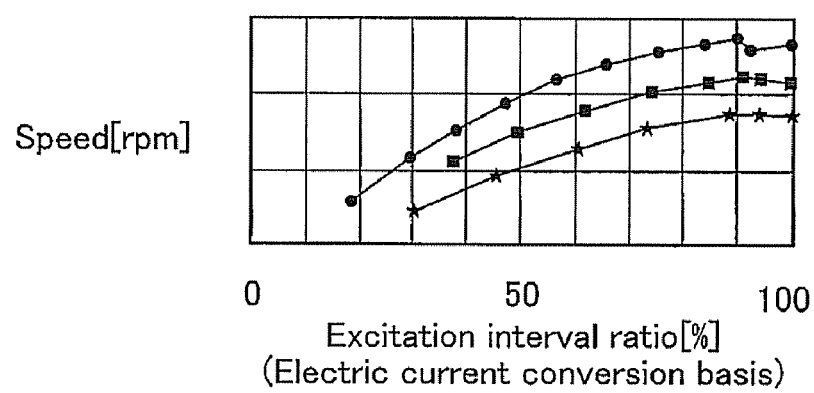
Figure 21C:
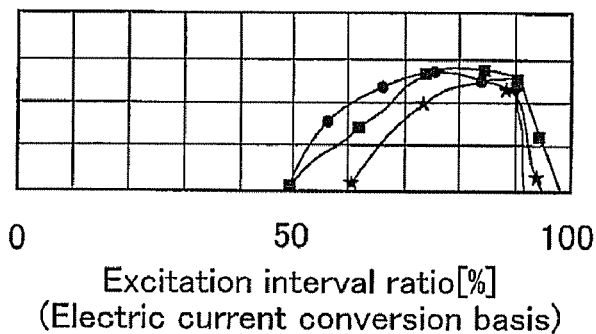

FIGS. 21A to 21C are graphs illustrating the effect of changing the excitation interval ratio EPR. At 15 (V), 12 (V), and 10 (V) mean the peak voltage of the PWM signal applied to the coils (i.e. the power supply voltage VSUP of the driver circuit 250 of FIG. 8). The numerical values in FIGS. 21A to 21C were measured with fixed load applied to the motor, in the steady state at constant torque and constant speed. FIG. 21A shows the relationship of excitation interval ratio EPR and power consumption. It is apparent that power consumption can be decreased as the excitation interval ratio EPR decreases. FIG. 21B shows the relationship of excitation interval ratio EPR and rotation speed. It is apparent that as the excitation interval ratio EPR decreases, rotation speed in the steady state decreases as well. However, up to an excitation interval ratio EPR of close to 70%, rotation speed is maintained even as excitation interval ratio EPR decreases. FIG. 21C shows the extent of reduction in power consumption afforded by the motor in which the excitation interval ratio EPR is set, compared with the motor in which all intervals is set to excitation intervals. FIG. 21C is depicted by comparing power consumption at given speed of a motor equipped with the excitation interval signal generator 590 and having an arbitrarily set excitation interval ratio EPR with that of a motor in which all intervals is set to excitation intervals. From FIG. 21C, it is apparent that the rate of reduction in power consumption is high in a region where the excitation interval ratio EPR is between 70% and 90%.

In Embodiment 1, as described above, at startup of the motor, all intervals except for the offset region OF are set to excitation intervals EP, and excitation intervals EP becomes smaller as the motor approaches the steady state. Consequently, it is possible to start and accelerate the motor smoothly while holding down power consumption. Lower power consumption makes it possible to achieve lower noise, less vibration, and lower heat emission of the motor.

B. Embodiment 2

Figure 22:
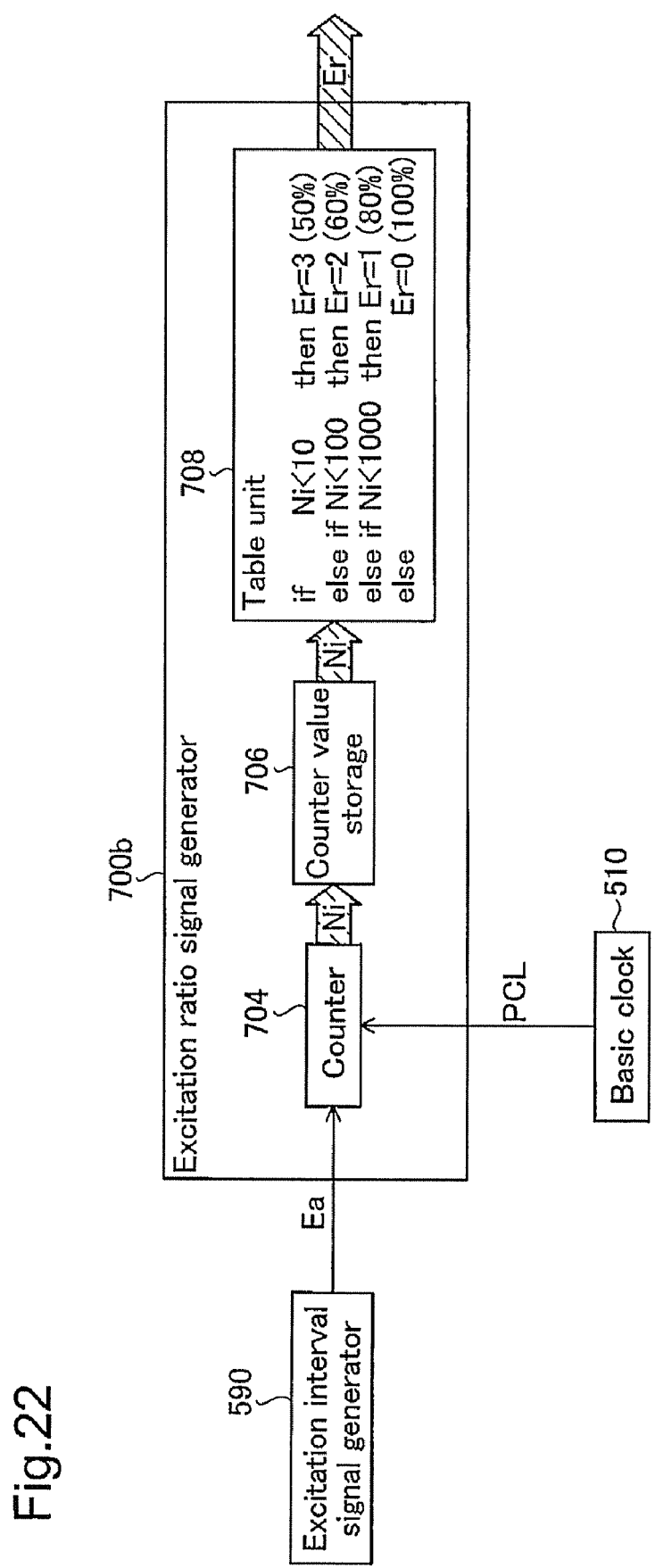
FIG. 22 is an illustration depicting internal configuration of a excitation ratio signal generator in embodiment 2.

FIG. 22 is an illustration depicting internal configuration of a excitation ratio signal generator 700b in embodiment 2. The only differences from Embodiment 1 shown in FIG. 18 are that the counter 704 is presented with the excitation interval signal Ea in place of the magnetic sensor output SSA, and that the voltage comparator 702 is omitted; the configuration is otherwise identical to Embodiment 1.

In the excitation interval signal Ea, the length of time from the rising edge which is the starting point of the High level interval, to the next rising edge is correlated with the rotation speed of the motor. Consequently, the excitation interval EP of the motor can be controlled arbitrarily with reference to motor speed in the same way as in Embodiment 1, by measuring the length of time between rising edges of the excitation interval signal Ea with the counter 704. In this case, since the excitation interval signal Ea is a digital signal, the voltage comparator 702 can be omitted. Analogously, the length of time from the falling edge which is the end point of the High level interval, to the next falling edge is also correlated with the rotation speed of the motor. So it is also possible to control the excitation interval EP by measuring the length of time between falling edges. In addition, it is also possible to control the excitation interval EP on the basis of the length of time between rising edges or falling edges of the positive signal Sp or negative signal Sn of the excitation interval signal Ea, instead of the excitation interval signal Ea in itself.

In this way, it is possible, on the basis of an arbitrary speed signal which indicates relative speed of the first and second drive members of the electric motor, to generate an excitation ratio signal Er which indicates the ratio of excitation intervals and non-excitation intervals of the coils of the electric motor, and to control the excitation interval EP thereby.

C. Embodiment 3

Figure 23A:
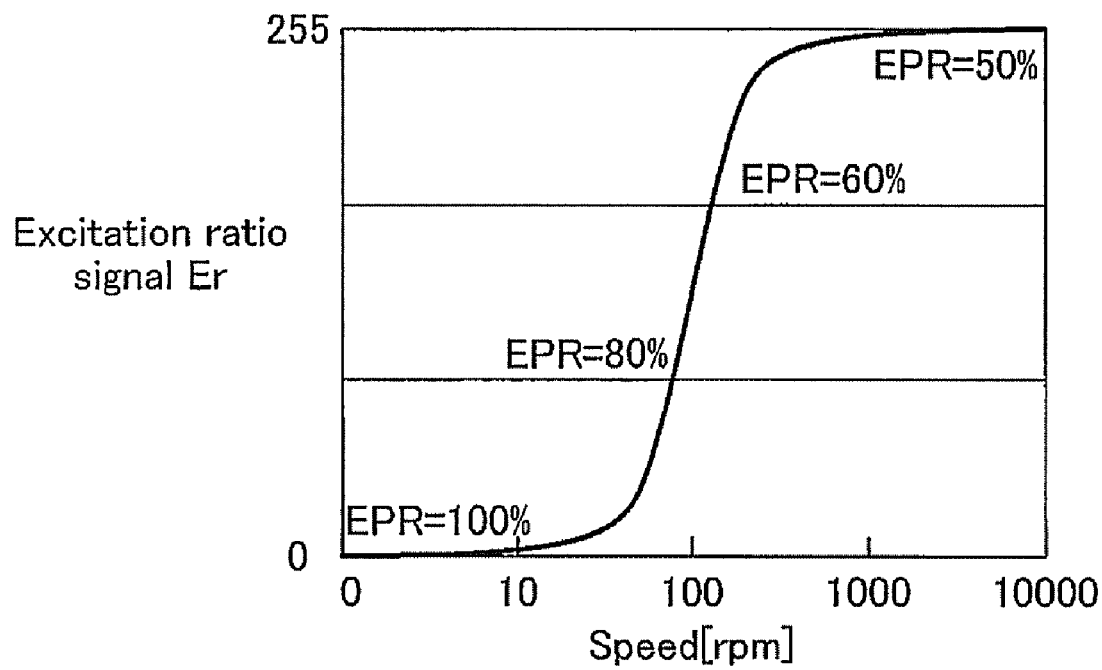
FIGS. 23A and 23B depict other examples of the relationship between motor speed (rpm) and the excitation ratio signal Er.
Figure 23B:
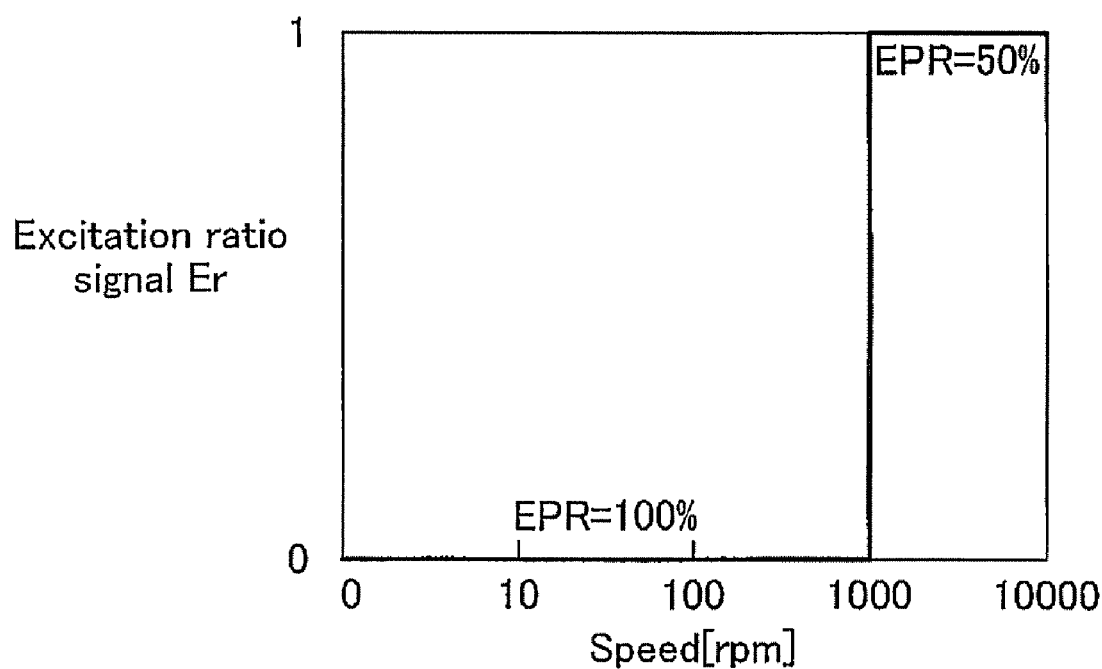

FIGS. 23A and 23B depict other examples of the relationship between motor speed (rpm) and the excitation ratio signal Er. In the preceding embodiments, the excitation ratio signal Er is provided with four values (Er=0, 1, 2, 3) by the table unit 708 (FIG. 18). However, the number of values that the excitation ratio signal Er allowed to be set to is not limited to four, and may be set to any number. For example, in FIG. 23A, the excitation ratio signal Er is allowed to be set to a range of 256 values from 0 to 255, making it possible to finely adjust the excitation interval EP setting depending on motor speed. In FIG. 23B, the excitation ratio signal Er is allowed to be set to two values of 0 or 1, and this configuration is suitable to be used in a simple system such as a fan motor. In this case, the table unit 708 can be omitted, and it is sufficient for the counter unit to determine whether the counter value exceed a prescribed counter value.

In this way, a startup of the electric motor, the excitation ratio signal Er is set so that the excitation interval EP is at its maximum value; and after startup of the electric motor, the excitation ratio signal Er is set so that the excitation interval EP is shorter as the relative speed of the first and second drive members increases.

D. Modifications

The present invention is not limited to the embodiments described hereinabove, and may be reduced to practice in various other ways without departing from the spirit thereof. Modifications such as the following are possible, for example.

D1. Modification 1

In the preceding embodiments, the excitation interval signal generator 590 is implemented using an analog circuit; however, it is possible instead to use an excitation interval signal generator 590b (not shown) composed of a digital circuit.

D2. Modification 2

In the preceding embodiments, the PWM signal generator 535 is used as the original drive signal generator, and the PWM signals 1, 2 are used as the original drive signals; however, it is possible instead to use a rectangular signal generating unit that generates a rectangular signal on the basis of a location signal which indicates relative location of the first and second drive members of the electric motor, and to use the rectangular signal as the drive signal.

D3. Modification 3

The present invention is applicable to various kinds of devices. For example, the present invention is implemented in a motor in any of various devices such as fan motors, clocks (for driving the hands), drum type washing machines (single rotation), jet coasters, vibrating motors, and the like. Where the present invention is implemented in a fan motor, the various advantages mentioned previously (low power consumption, low vibration, low noise, minimal rotation irregularity, low heat emission, and long life) is particularly notable. Such fan motors can be employed, for example, as fan motors for various devices such as digital display devices, vehicle on-board devices, fuel cell type PCs, fuel cell type digital cameras, fuel cell type video cameras, fuel cell type mobile phones, various other fuel cell-powered devices, and projectors. The motor of the present invention may also be utilized as a motor for various types of household electric appliances and electronic devices. For example, a motor in accordance with the present invention may be employed as a spindle motor in an optical storage device, magnetic storage device, polygon mirror drive, or the like. The motor of the present invention may also be utilized as a motor for a movable body or a robot.

Figure 24:
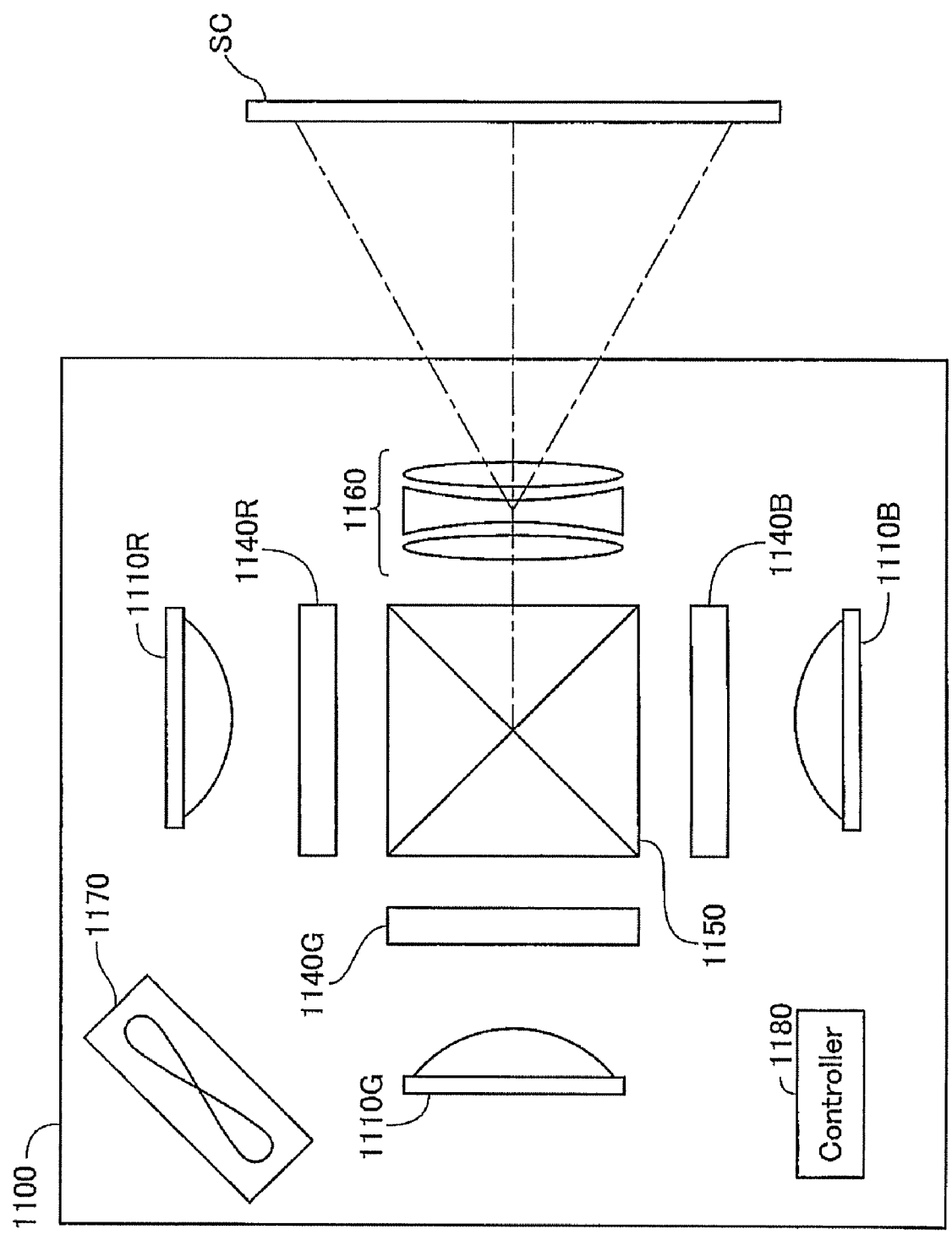
FIG. 24 is an illustration depicting a projector which utilizes a motor according to the present invention.

FIG. 24 is an illustration depicting a projector which utilizes a motor according to the present invention. This projector 1100 has three light sources 1110R, 1110G, 1110B for emitting light of the three colors red, green, and blue; liquid crystal light valves 1140R, 1140G, 1140B for modulating light of the three colors; a cross dichroic prism 1150 for synthesizing modulated light of the three colors; a projection lens system 1160 for projecting light synthesized from the three colors onto a screen SC; a cooling fan 1170 for cooling the interior of the projector; and a controller 1180 for controlling the entire projector 1100. Any of the various brushless motors described above may be used as the motor for driving the cooling fan 1170.

Figure 25A:
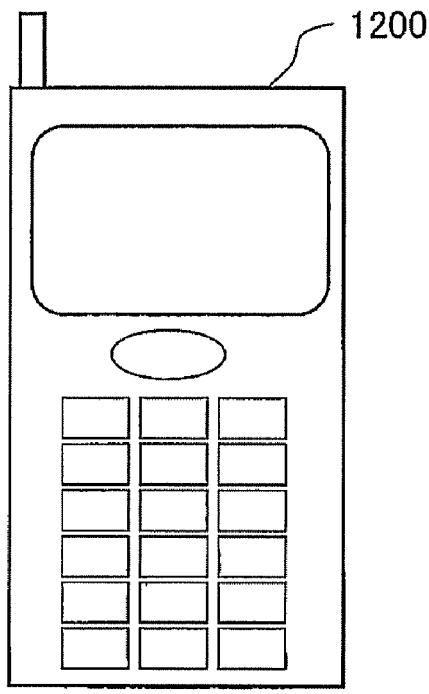
FIGS. 25A to 25C illustrate a fuel cell type mobile phone which utilizes a motor according to the present invention.
Figure 25B:
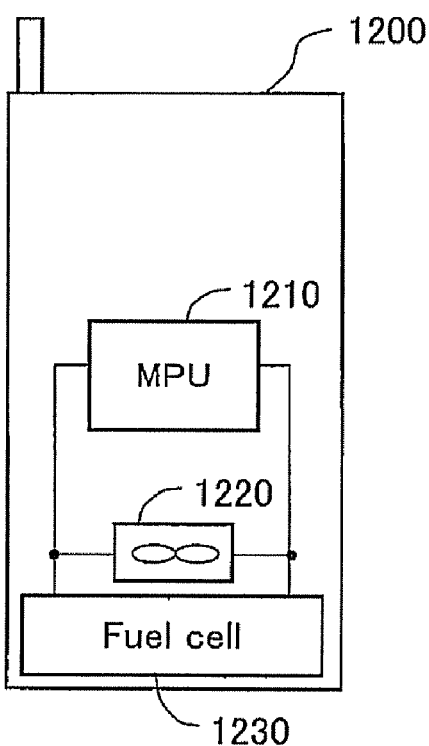
Figure 25C:
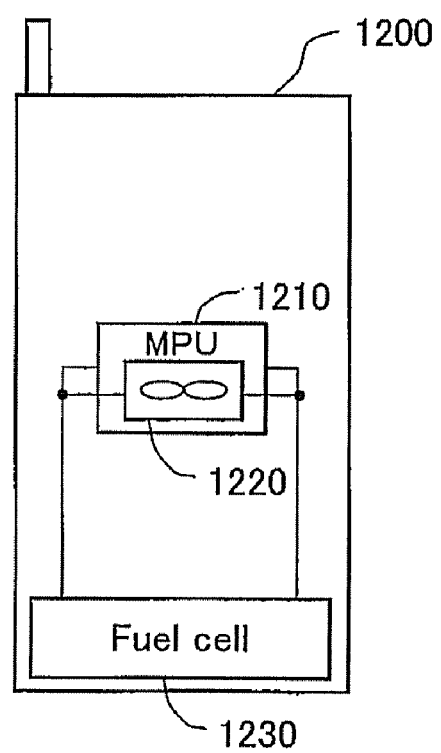

FIGS. 25A to 25C illustrate a fuel cell type mobile phone which utilizes a motor according to the present invention. FIG. 25A shows an exterior view of a mobile phone 1200, and FIG. 25B shows an example of internal configuration. The mobile phone 1200 includes an MPU 1210 for controlling operation of the mobile phone 1200; a fan 1220; and a fuel cell 1230. The fuel cell 1230 supplies power to the MPU 1210 and to the fan 1220. The fan 1220 blows air into the mobile phone 1200 from the outside in order to supply air to the fuel cell 1230, or in order to expel moisture evolved in the fuel cell 1230 from the inside of the mobile phone 1200 to the outside. The fan 1220 may also be positioned on the MPU 1210 as shown in FIG. 25C, to cool the MPU 1210. Any of the various brushless motors described above can be used as the motor for driving the fan 1220.

Figure 26:
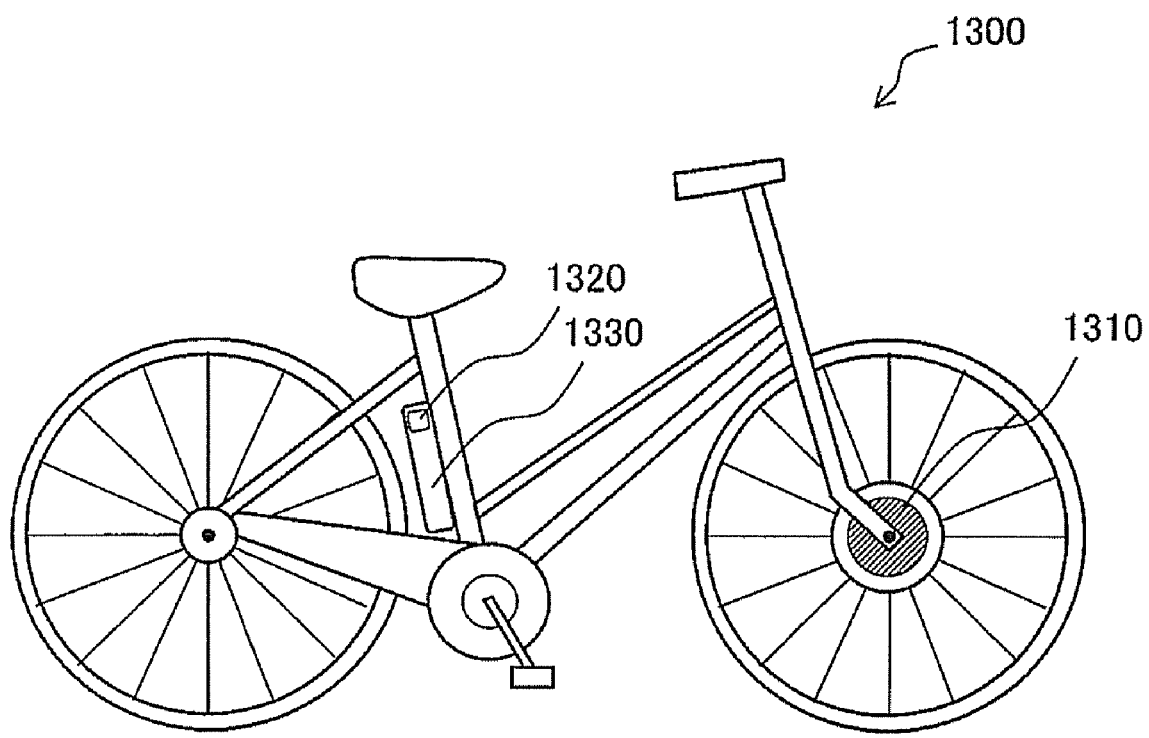
FIG. 26 is an illustration depicting an electrically powered bicycle (power assisted bicycle) as one example of a movable body that utilizes a motor/generator according to the embodiments of the present invention.

FIG. 26 is an illustration depicting an electrically powered bicycle (power assisted bicycle) as one example of a movable body that utilizes a motor/generator according to the embodiments of the present invention. This bicycle 1300 is provided with a motor 1310 on its front wheel; and with a control circuit 1320 and a rechargeable battery 1330 disposed on the frame below the saddle. The motor 1310 uses power from the rechargeable battery 1330 to drive the front wheel, thereby assisting travel. During braking, regenerative power from the motor 1310 is used to charge the rechargeable battery 1330. The control circuit 1320 is a circuit for controlling driving and regeneration of the motor. Any of the various brushless motors described above can be used as the motor 1310.

Figure 27:
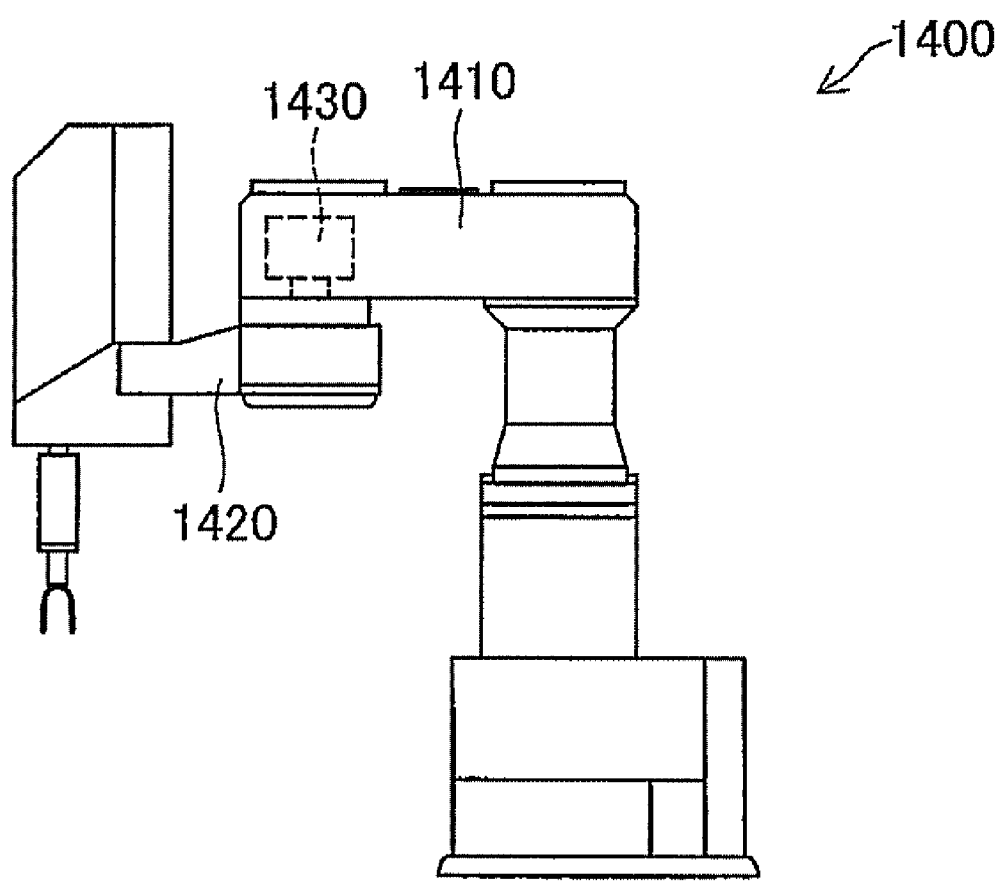
FIG. 27 is an illustration showing an example of a robot which utilizes a motor according to the embodiments of the present invention.

FIG. 27 is an illustration showing an example of a robot which utilizes a motor according to the embodiments of the present invention. This robot 1400 has first and second arms 1410, 1420, and a motor 1430. This motor 1430 is used during horizontal rotation of the second arm 1420 as the driven member. Any of the various brushless motors described above can be used as the motor 1430.

E. Other Embodiments

Figure 28:
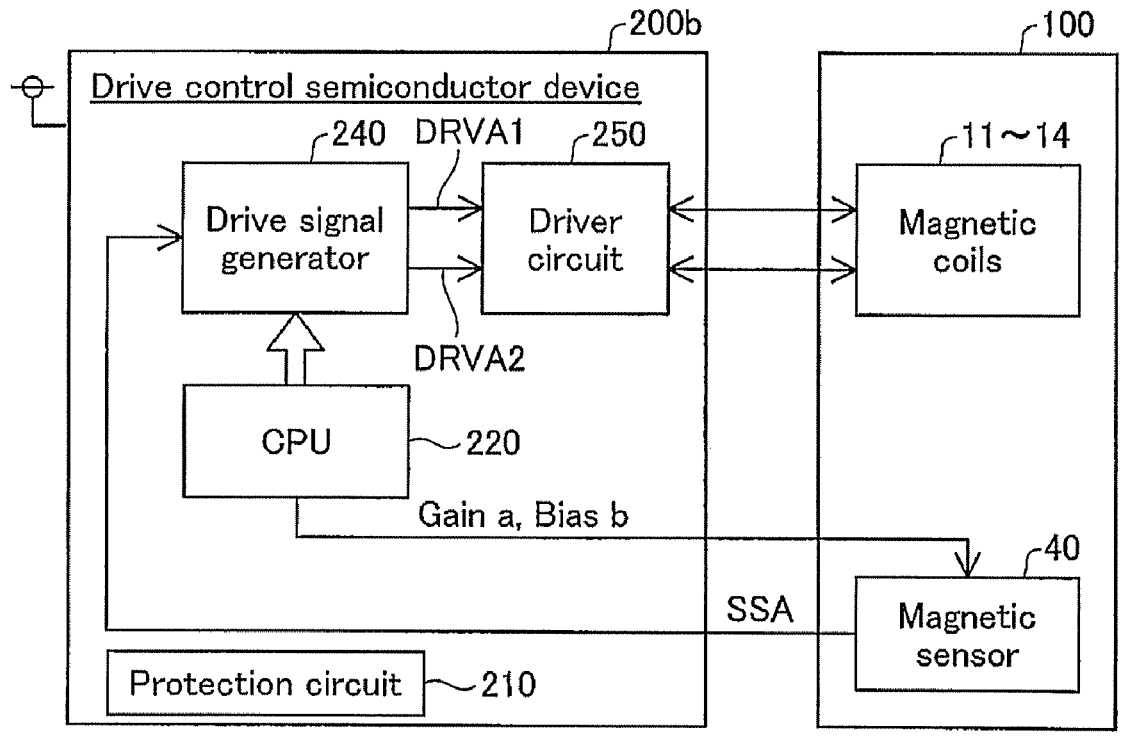
FIG. 28 is a block diagram showing the configuration of a drive control semiconductor device and the motor unit of the blushless motor in another embodiment.

FIG. 28 is a block diagram showing the configuration of a drive control semiconductor device 200b and the motor unit 100 of the blushless motor in another embodiment. The drive control semiconductor device 200b has a drive signal genera-tor 240, a driver circuit 250, a CPU 220, and a protection circuit 210. The drive signal generator 240, the driver circuit 250, and the CPU 220 are the same as those shown in FIG. 7A. The protection circuit 210 is a circuit for protecting the motor that utilizes the drive control semiconductor device 200b by detecting troubles of the motor. Examples of the protection circuit 210 include an overheat protection circuit, an overvoltage protection circuit, and an overcurrent protection circuit for power ICs; and a low-voltage protection circuit for control ICs. As described above, the semiconductor device for driving the blushless motor may include the drive signal generator 240, the driver circuit 250, the CPU 220, and the protection circuit 210 like the drive control semiconductor device 200b shown in FIG. 28. However, the protection circuit 210 may be omitted.

Figure 29:
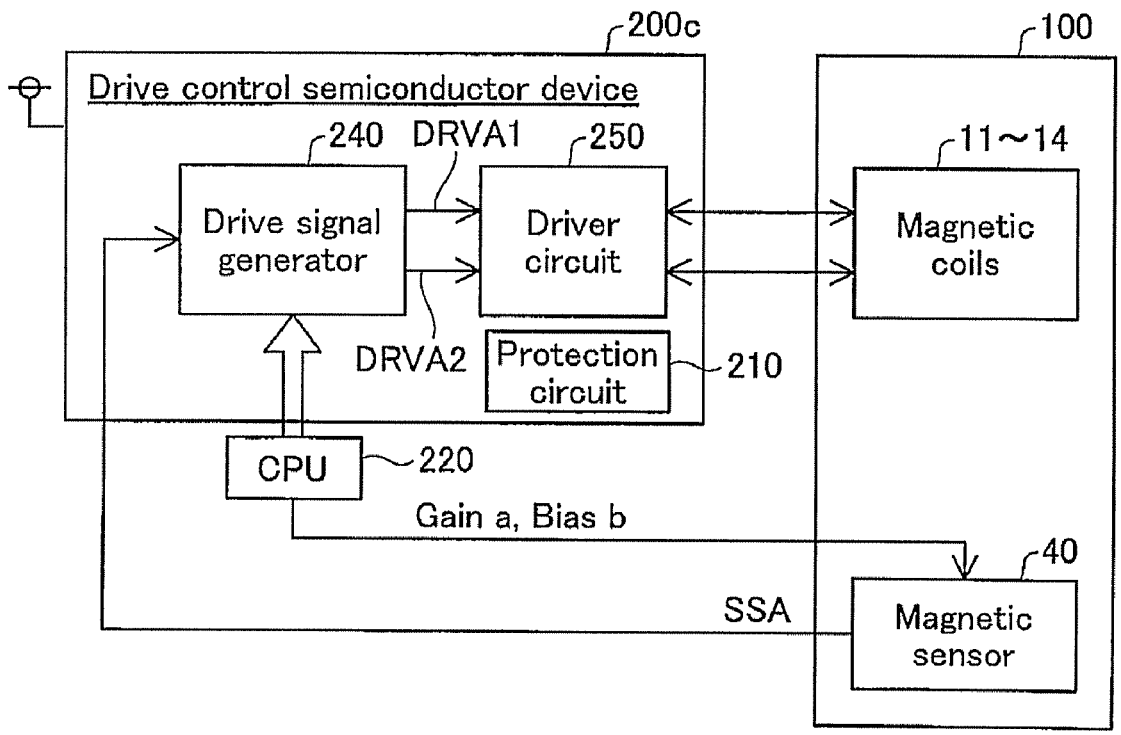
FIG. 29 is a block diagram showing the configuration of a drive control semiconductor device and the motor unit of the blushless motor in another embodiment.

FIG. 29 is a block diagram showing the configuration of a drive control semiconductor device 200c and the motor unit 100 of the blushless motor in still another embodiment. The difference between the drive control semiconductor device 200c and the drive control semiconductor device 200b shown in FIG. 28 is that the CPU 220 is not included in the drive control semiconductor device 200c. As described above, the semiconductor device for driving the blushless motor need not include the CPU 220 like the drive control semiconductor device 200c shown in FIG. 29. In addition, the protection circuit 210 may be omitted.

Figure 30:
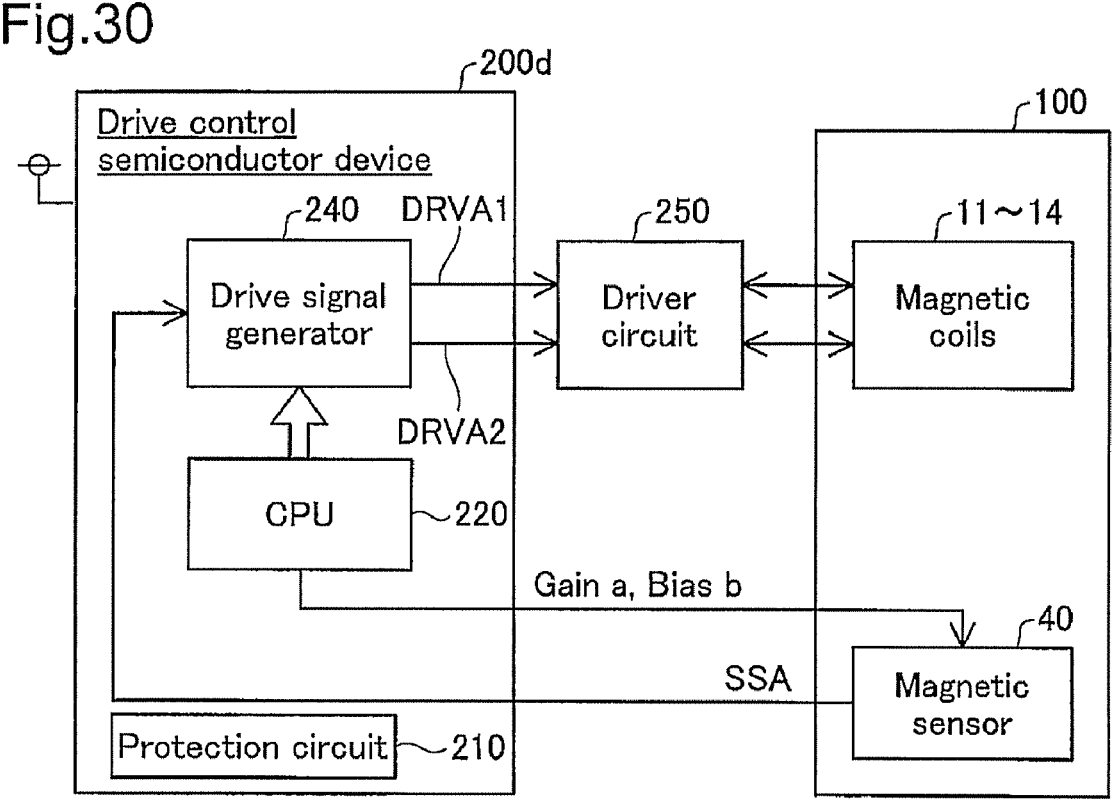
FIG. 30 is a block diagram showing the configuration of a drive control semiconductor device and the motor unit of the blushless motor in another embodiment.

FIG. 30 is a block diagram showing the configuration of a drive control semiconductor device 200d and the motor unit 100 of the blushless motor in another embodiment. The difference between the drive control semiconductor device 200d and the drive control semiconductor device 200b shown in FIG. 28 is that the driver circuit 250 is not included in the drive control semiconductor device 200d. As described above, the semiconductor device for driving the blushless motor need not include the driver circuit 250 like the drive control semiconductor device 200d shown in FIG. 30. In this case, it is preferable that the protection circuit 210 is constructed of a protection circuit for protecting a control circuit like a low-voltage protection circuit. However, the protection circuit 210 may be omitted.

Figure 31:
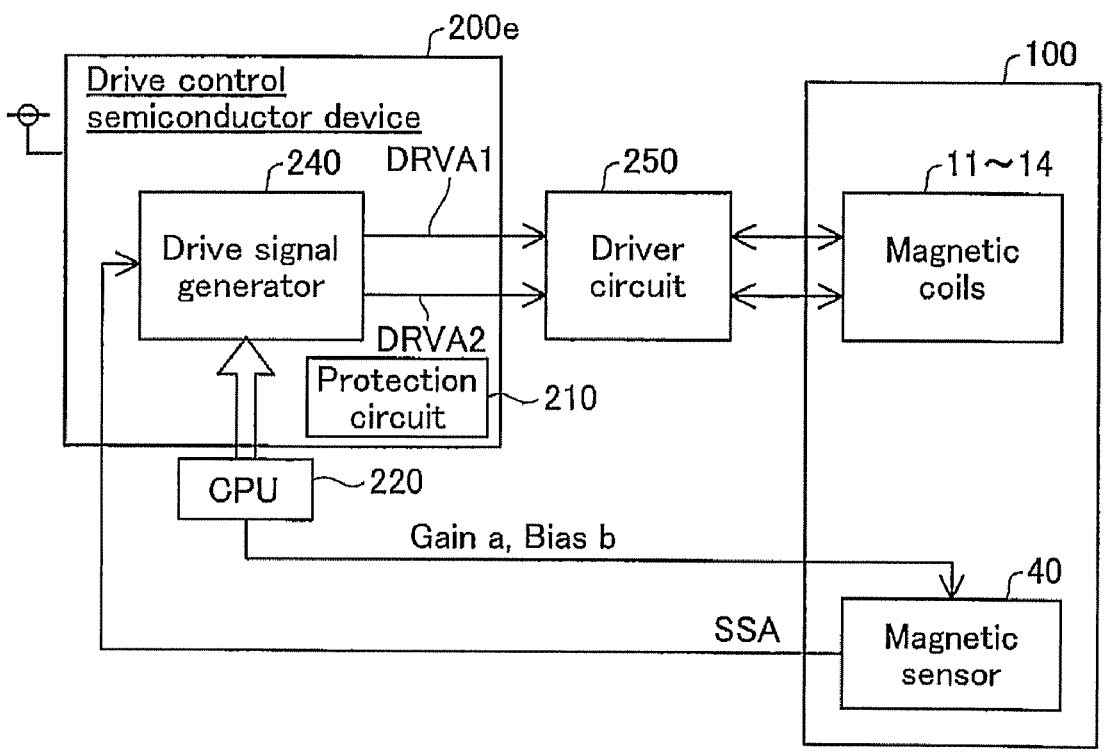
FIG. 31 is a block diagram showing the configuration of a drive control semiconductor device and the motor unit of the blushless motor in another embodiment.
Figure 32:
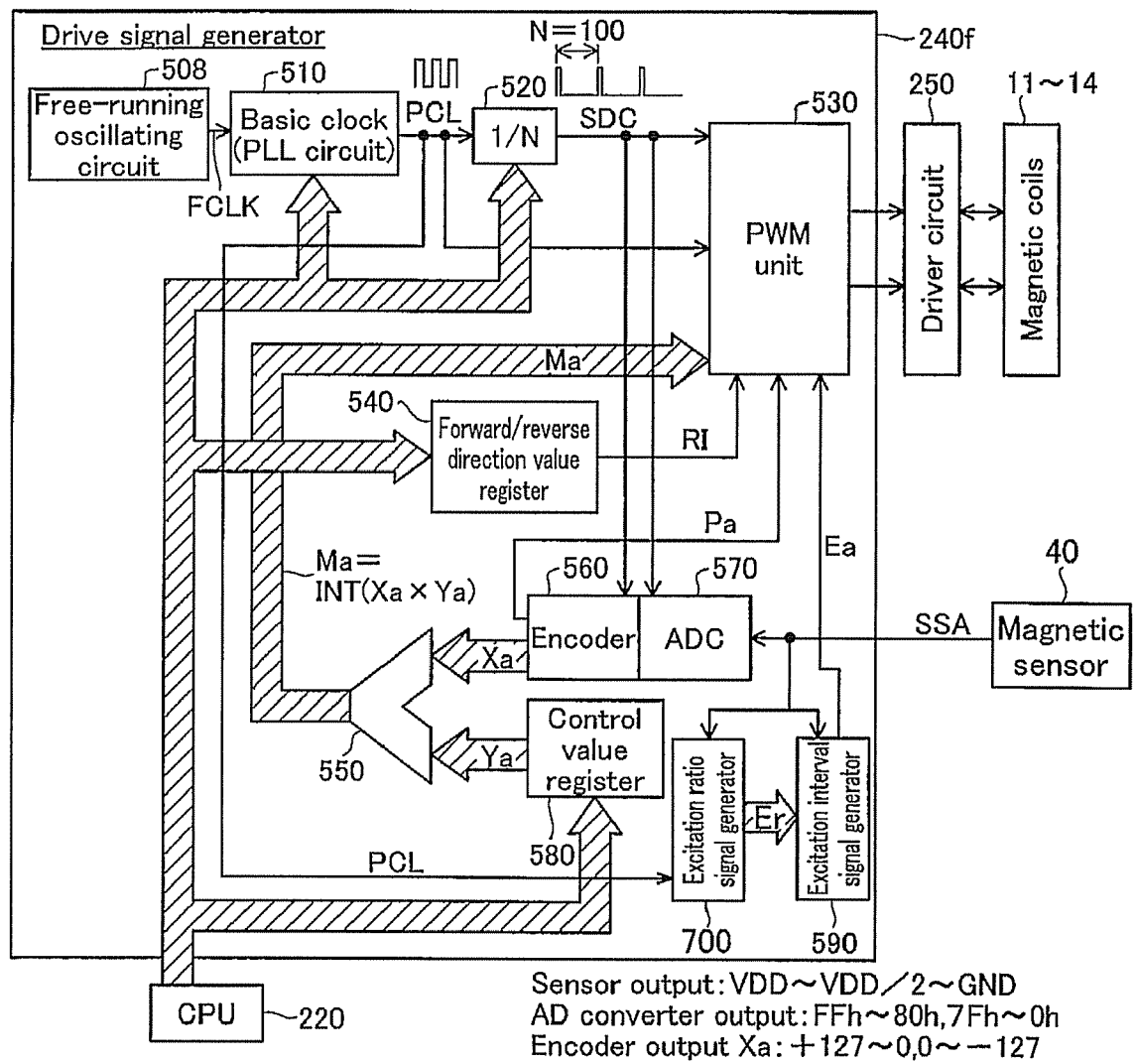
FIGS. 32A to 32E are illustrations depicting internal configuration and operation of the drive signal generator 240f in another embodiment.

FIG. 31 is a block diagram showing the configuration of a drive control semiconductor device 200e and the motor unit 100 of the blushless motor in another embodiment. The difference between the drive control semiconductor device 200e and the drive control semiconductor device 200b shown in FIG. 28 is that the CPU 220 and the driver circuit 250 are not included in the drive control semiconductor device 200e. As described above, the semiconductor device for driving the blushless motor need not include the CPU 220 and the driver circuit 250 like the drive control semiconductor device 200e shown in FIG. 31. That is to say, other integrated circuits may include the driver circuit 250. In this case, it is possible to utilize all-purpose driver integrated circuits instead of the driver circuit 250. However, the protection circuit 210 may be omitted.

FIGS. 32A to 32E are illustrations depicting internal configuration and operation of the drive signal generator 240f in another embodiment. The difference between the drive signal generator 240f and the drive signal generator 240 shown in FIG. 11A is that the drive signal generator 240f is provided with a free-running oscillating circuit 508 in front of the basic clock generating circuit 510 (PLL circuit). The free-running oscillating circuit 508 generates a original clock signal FCLK provided to the basic clock generating circuit 510. The basic clock generating circuit 510 generates the clock signal PCL on the basis of the original clock signal FCLK. It is possible to utilize various kinds of oscillating circuits like a ring oscillator as the free-running oscillating circuit 508. As described above, it is possible to utilize the drive signal generator 240*f* (FIG. 32A) instead of the drive signal generator 240 (FIG. 11A). That is to say, the semiconductor device for driving the blushless motor may include the free-running oscillating circuit 508.

Figure 33:
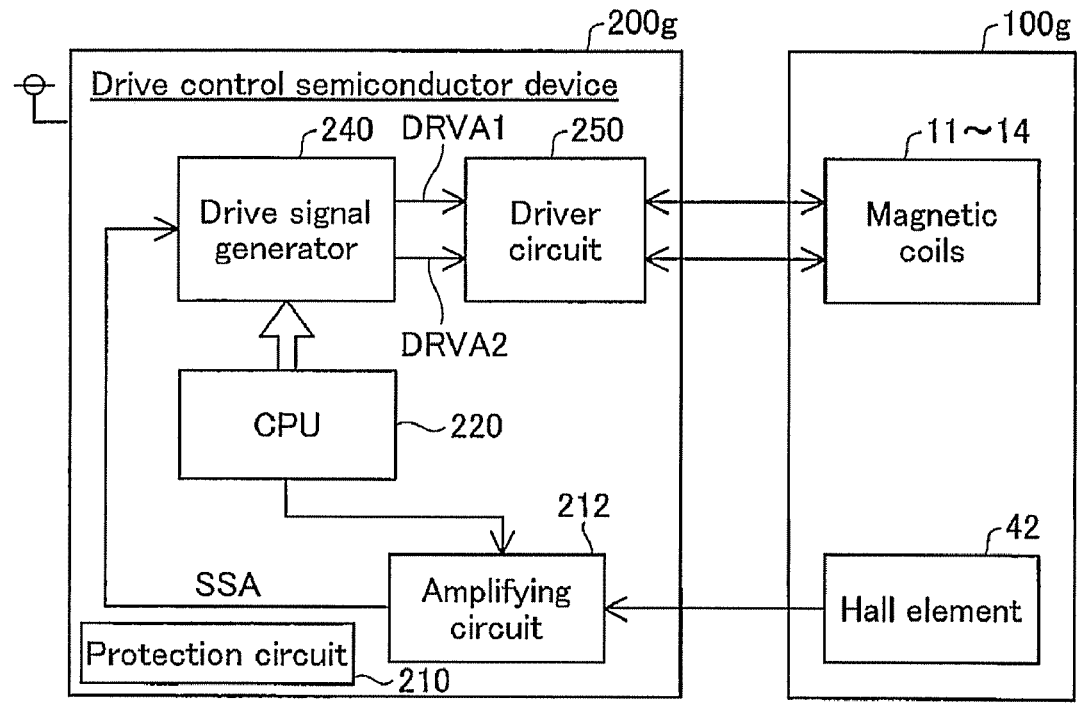
FIG. 33 is a block diagram showing the configuration of a drive control semiconductor device and the motor unit of the blushless motor in another embodiment.

FIG. 33 is a block diagram showing the configuration of a drive control semiconductor device 200*g* and the motor unit 100*g* of the blushless motor in another embodiment. The difference between the drive control semiconductor device 200*g* and the drive control semiconductor device 200*b* shown in FIG. 28 is that the drive control semiconductor device 200*g* is provided with a amplifying circuit 212. In this case, a hall element 42 is provided in the drive control semiconductor device 200*g*. A output signal of the hall element 42 is amplified by the amplifying circuit 212 in the drive control semiconductor device 200*g* to become the sensor output SSA. As described above, the semiconductor device for driving the blushless motor can include the amplifying circuit 212 like the drive control semiconductor device 200*g* shown in FIG. 33.

Figure 34:
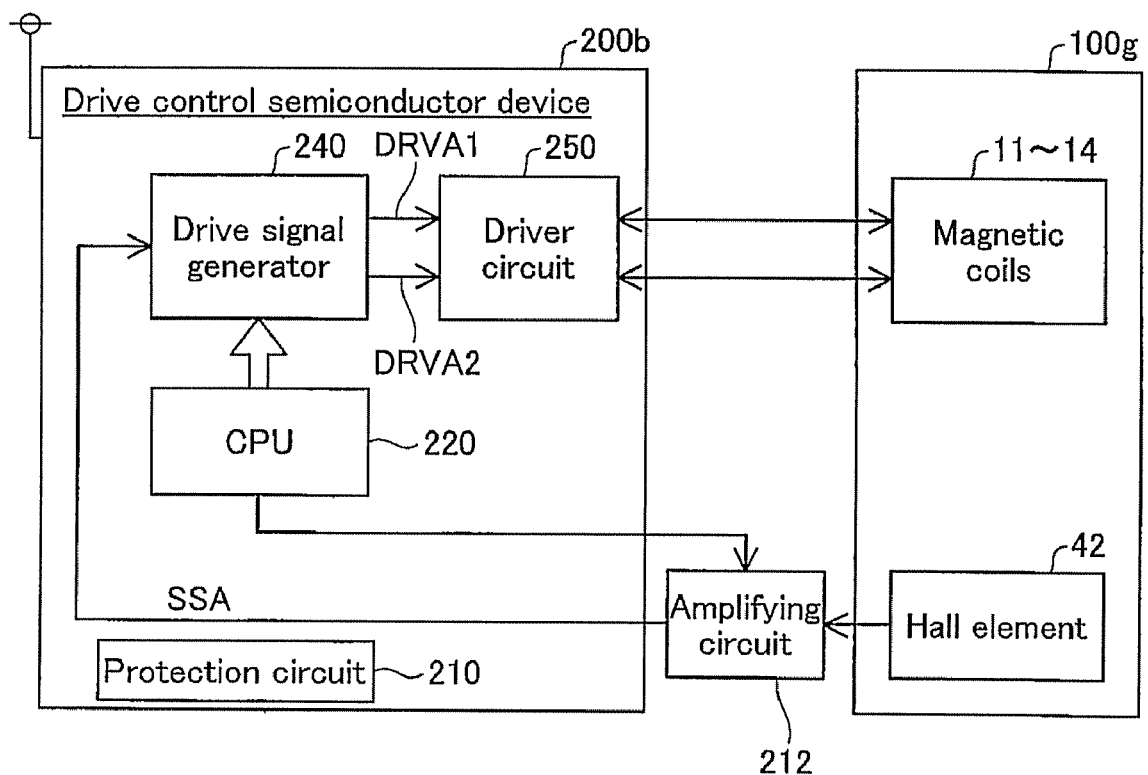
FIG. 34 is a block diagram showing the configuration of a drive control semiconductor device and the motor unit of the blushless motor in another embodiment.

FIG. 34 is a block diagram showing the configuration of a drive control semiconductor device 200*b* and the motor unit 100*g* of the blushless motor in another embodiment. In FIG. 34, the amplifying circuit 212 is provided outside of the drive control semiconductor device 200*b*. As described above, shown in FIG. 34, the semiconductor device for driving the blushless motor needs not include the amplifying circuit 212.

As well, the configurations of the semiconductor devices of embodiments described above are some examples of configurations. It is possible to employ various other configurations of the semiconductor devices.

What is claimed is:

1. A drive control circuit for an electric motor, the drive control circuit comprising:
   an original drive signal generator that generates an original signal based on a positional signal, wherein the positional signal indicates a relative position of a first drive member of the electric motor and a second drive member of the electric motor;
   an excitation ratio signal generator that generates an excitation ratio signal based on a speed signal, wherein the speed signal indicates a relative speed of the first drive member and the second drive member, and wherein the excitation ratio signal indicates a ratio of excitation interval to non-excitation interval of coils of the electric motor;
   an excitation interval signal generator that generates a binary excitation interval signal based on the positional signal and the excitation ratio signal, wherein the excitation interval signal specifies either the excitation interval or the non-excitation interval; and
   a mask circuit that generates a drive signal by masking part of the original drive signal based on the excitation interval signal, wherein;
   the drive signal drives the electric motor;
   the mask circuit outputs the original drive signal as the drive signal only when the excitation interval signal specifies the excitation interval;
   the excitation ratio signal generator, at startup of the electric motor, sets the excitation ratio signal such that the excitation interval is a predetermined maximum value;
   the excitation ratio signal generator, subsequent to startup of the electric motor, sets the excitation ratio signal such that the excitation interval becomes shorter as the relative speed indicated by the speed signal increases;
   the speed signal includes a cyclical binary timing signal synchronized with the positional signal; and
   the excitation ratio signal generator includes:
      a counter that counts a number of clock pulses during an interval for which the timing signal is a first level; and
      a table unit that determines a value of the excitation ratio signal from a table depending on the number of clock pulses.

2. The drive control circuit according to claim 1, wherein the original drive signal generator includes a PWM signal generator that generates, as the original drive signal, a PWM signal that is based on the positional signal and synchronized with the positional signal.

3. A device according to claim 1, wherein the excitation ratio signal generator, subsequent to startup of the electric motor, adjusts the excitation ratio signal to gradually shorten the excitation interval as the relative speed indicated by the speed signal increases.

4. A drive control circuit for an electric motor, the drive control circuit comprising:
   an original drive signal generator that generates an original drive signal based on a positional signal, wherein the positional signal indicates a relative position of a first drive member of the electric motor and a second drive member of the electric motor;
   an excitation ratio signal generator that generates an excitation ratio signal based on a speed signal, wherein the speed signal indicates a relative speed of the first drive member and the second drive member, and wherein the excitation ratio signal indicates a ratio of excitation interval to non-excitation interval of coils of the electric motor;
   an excitation interval signal generator that generates a binary excitation interval signal based on the positional signal and the excitation ratio signal, wherein the excitation interval signal specifies either the excitation interval or the non-excitation interval; and
   a mask circuit that generates a drive signal by masking part of the original drive signal based on the excitation interval signal, wherein;
   the drive signal drives the electric motor;
   the mask circuit outputs the original drive signal as the drive signal only when the excitation interval signal specifies the excitation interval;
   the excitation ratio signal generator, at startup of the electric motor, sets the excitation ratio signal such that the excitation interval is a predetermined maximum value;
   the excitation ratio signal generator, subsequent to startup of the electric motor, sets the excitation ratio signal such that the excitation interval becomes shorter as the relative speed indicated by the speed signal increases;
   the speed signal includes a cyclical binary timing signal synchronized with the positional signal; and
   the excitation ratio signal generator includes:
      an interval measurer that measures a first level interval which is a length of time for which the timing signal indicates a first level; and
      an excitation ratio setter that sets the excitation ratio signal based on the measured first level interval.

5. A device according to claim 4, wherein the excitation ratio signal generator, subsequent to startup of the electric motor, adjusts the excitation ratio signal to gradually shorten the excitation interval as the relative speed indicated by the speed signal increases.

6. A semiconductor device that drives an electric motor, the semiconductor device comprising:

an original drive signal generator that generates an original drive signal based on a positional signal, wherein the positional signal indicates a relative position of a first drive member of the electric motor and a second drive member of the electric motor;

an excitation ratio signal generator that generates an excitation ratio signal based on a speed signal, wherein the speed signal indicates a relative speed of the first drive member and the second drive member, and wherein the excitation ratio signal indicates a ratio of excitation interval to non-excitation interval of coils of the electric motor;

an excitation interval signal generator that generates a binary excitation interval signal based on the positional signal and the excitation ratio signal, wherein the excitation interval signal specifies either the excitation interval or the non-excitation interval; and a mask circuit that generates a drive signal by masking part of the original drive signal based on the excitation interval signal, wherein:

the drive signal drives the electric motor;

the mask circuit outputs the original drive signal as the drive signal only when the excitation interval signal specifies the excitation interval;

the excitation ratio signal generator, at startup of the electric motor, sets the excitation ratio signal such that the excitation interval is a predetermined maximum value;

the excitation ratio signal generator, subsequent to startup of the electric motor, sets the excitation ratio signal such that the excitation interval becomes shorter as the relative speed indicated by the speed signal increases;

the speed signal includes a cyclical binary timing signal synchronized with the positional signal; and the excitation ratio signal generator includes:
  a counter that counts a number of clock pulses during an interval for which the timing signal is a first level; and
  a table unit that determines a value of the excitation ratio signal from a table depending on the number of clock pulses.

7. A semiconductor device according to claim 6, further comprising:
a clock signal generator that generates a clock signal;
wherein the original drive signal generator generates the original drive signal by utilizing the clock signal; and
the excitation ratio signal generator generates the excitation ratio signal by utilizing the clock signal.

8. A semiconductor device according to claim 6, further comprising:
an analog-digital converter that converts the positional signal to digital positional signal values,
wherein the original drive signal generator generates the original drive signal based on the digital positional signal values.

9. A semiconductor device according to claim 8, further comprising:
an amplifier that amplifies the positional signal,
wherein the analog-digital converter converts the amplified positional signal to digital values.

10. A semiconductor device according to claim 6, wherein the excitation ratio signal generator, subsequent to startup of the electric motor, adjusts the excitation ratio signal to gradually shorten the excitation interval as the relative speed indicated by the speed signal increases.

11. A motor system, comprising:
a drive control circuit; and
an electric motor that is controlled by the drive control circuit, wherein:
the drive control circuit includes:
  an original drive signal generator that generates an original drive signal based on a positional signal, wherein the positional signal indicates a relative position of a first drive member of the electric motor and a second drive member of the electric motor;
  an excitation ratio signal generator that generates an excitation ratio signal based on a speed signal, wherein the speed signal indicates a relative speed of the first drive member and the second drive member, and wherein the excitation ratio signal indicates a ratio of excitation interval to non-excitation interval of coils of the electric motor;
  an excitation interval signal generator that generates a binary excitation interval signal based on the positional signal and the excitation ratio signal, wherein the excitation interval signal specifies either the excitation interval or the non-excitation interval; and
  a mask circuit that generates a drive signal by masking part of the original drive signal based on the excitation interval signal, wherein:
the drive signal drives the electric motor;
the mask circuit outputs the original drive signal as the drive signal only when the excitation interval signal specifies the excitation interval;
the excitation ratio signal generator, at startup of the electric motor, sets the excitation ratio signal such that the excitation interval is a predetermined maximum value;
the excitation ratio signal generator, subsequent to startup of the electric motor, sets the excitation ratio signal such that the excitation interval becomes shorter as the relative speed indicated by the speed signal increases;
the speed signal includes a cyclical binary timing signal synchronized with the positional signal; and
the excitation ratio signal generator includes:
  a counter that counts a number of clock pulses during an interval for which the timing signal is a first level; and
  a table unit that determines a value of the excitation ratio signal from a table depending on the number of clock pulses.

12. A device, comprising:
the motor system according to claim 11; and
a driven member which is driven by the electric motor.

13. A device according to claim 12, wherein the device is a projector.

14. A device according to claim 12, wherein the device is a mobile device.

15. A device according to claim 12, wherein the device is a robot.

16. A device according to claim 12, wherein the device is a movable body.

17. A motor system according to claim 11, wherein the excitation ratio signal generator, subsequent to startup of the electric motor, adjusts the excitation ratio signal to gradually shorten the excitation interval as the relative speed indicated by the speed signal increases.

* * * * *